(12) United States Patent
Nakamura et al.

(10) Patent No.: US 7,437,074 B2
(45) Date of Patent: *Oct. 14, 2008

(54) WAVELENGTH DIVISION MULTIPLEXING TRANSMISSION SYSTEM

(75) Inventors: Kentaro Nakamura, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

This patent is subject to a terminal disclaimer.

(21) Appl. No.: 10/809,929

(22) Filed: Mar. 26, 2004

(65) Prior Publication Data

US 2004/0202473 A1 Oct. 14, 2004

(30) Foreign Application Priority Data

Mar. 26, 2003 (JP) .............................. 2003-083984

(51) Int. Cl.
*H04J 14/02* (2006.01)
*H04B 10/04* (2006.01)
*H04B 10/08* (2006.01)

(52) U.S. Cl. .......................... 398/82; 398/201; 398/212

(58) Field of Classification Search ........................ None
See application file for complete search history.

(56) References Cited

U.S. PATENT DOCUMENTS

| 6,545,782 | B1 * | 4/2003 | Wang et al. .................... 398/79 |
| 2003/0035168 | A1 * | 2/2003 | Qian et al. ................... 359/124 |
| 2003/0099013 | A1 * | 5/2003 | Su et al. ...................... 359/124 |
| 2003/0215233 | A1 | 11/2003 | Tomofuji et al. |
| 2005/0013615 | A1 * | 1/2005 | Matsuda ...................... 398/83 |
| 2005/0041975 | A1 * | 2/2005 | Nakamura et al. ........... 398/85 |
| 2007/0116468 | A1 * | 5/2007 | Jl et al. ........................ 398/79 |

FOREIGN PATENT DOCUMENTS

JP          2002-112294          4/2002

OTHER PUBLICATIONS

Kitoh, Tsutomu, et al., "A Method for Designing Interleave Filters Based on the Theory of Planar-Lightwave-Circuit Syntheses", NTT R&D, vol. 50, No. 4, 2001.

* cited by examiner

*Primary Examiner*—Kenneth Vanderpuye
*Assistant Examiner*—David S Kim
(74) *Attorney, Agent, or Firm*—Staas & Halsey LLP

(57) ABSTRACT

A WDM transmission system is provided which can multiplex/demultiplex and transmit wavelength division multiplexing signals, where signal lights have a different signal bandwidth, in a status without much deterioration of transmission quality. In the WDM transmission system, an optical receiver includes a demultiplexing unit which demultiplexes the wavelength division multiplexing signals and outputs the demultiplexed signal lights from a plurality of output ports, wherein each output port has transmission characteristics to be set such that the bandwidth of the transmission band where the light transmits and the bandwidth of the non-transmission band where light does not transmit are different, and the transmission band substantially matches with the signal band of the signal lights that are output from the output port out of the received wavelength division multiplexing signals.

6 Claims, 17 Drawing Sheets

| BIT RATE | WAVELENGTH INTERVAL | SPECTRAL EFFICIENCY |
|---|---|---|
| 10 Gbit/s | 50 GHz | 0.20 |
| 10 Gbit/s | 25 GHz | 0.40 |
| 40 Gbit/s | 100 GHz | 0.40 |
| 10 Gbit/s & 40 Gbit/s | 50 GHz | 0.50 |
| 40 Gbit/s | 75 GHz | 0.53 |

WAVELENGTH DIVISION MULTIPLEXING TRANSMISSION SYSTEM

BACKGROUND OF THE INVENTION

1. Field of the Invention

The present invention relates to a wavelength division multiplexing transmission system, and more particularly to a wavelength division multiplexing system for multiplexing and transmitting wavelength division multiplexing signals where signal lights with different signal bandwidths are wavelength-division multiplexed, or receiving and demultiplexing wavelength division multiplexing signals.

The present invention also relates to an optical transmitter for multiplexing a plurality of signal lights and transmitting the same as wavelength division multiplexing signals and an optical receiver for receiving the wavelength division multiplexing signals and demultiplexing the same into signal lights with a respective wavelength, which are included in the wavelength division multiplexing transmission system.

2. Description of the Related Art

Recently the capacity of Wavelength Division Multiplexing (WDM) transmission systems is increasing. A method of increasing capacity is a method of increasing the number of wavelengths to be multiplexed and increasing the transmission speed (bit rate) of the signals with respective wavelengths. At the moment, 10 Gbit/s WDM transmission systems have already been commercialized, and research and development of 40 Gbit/s optical transmission systems are in-progress.

However, to introduce a 40 Gbit/s WDM transmission system, a partial upgrade of switching a part of a conventional 10 Gbit/s WDM transmission system to a 40 Gbit/s is considered in terms of the installation cost and upgrading in-services, rather than installing a WDM transmission system of which signal lights with all wavelengths are 40 Gbit/s. In other words, upgrading to a WDM transmission system where a 10 Gbit/s and 40 Gbit/s systems coexist is being considered.

As the number of wavelengths to be multiplexed increases, the wavelength interval between signals becomes closer, and at the moment, a system with a 50 GHz wavelength interval (frequency interval) is commercialized for 10 Gbit/s systems, and the use of a 100 GHz wavelength interval (frequency interval) is under consideration for 40 Gbit/s systems.

For this increase in the density of wavelengths, a method of multiplexing/demultiplexing lights by an arrayed wave guide grating (AWG) filter and a multi-layer film filter at a 1:N channel optical multiplexing/demultiplexing module and then further multiplexing/demultiplexing this light using an interleaver is used. For the index of increasing the density of wavelengths, spectral efficiency to indicate the bit rate per unit frequency is used. In the case of a 10 Gbit/s system, this bit rate is 0.2 bit/s/Hz (=10 Gbit/s ÷50 GHZ), and in the case of a 40 Gbit/s system, this bit rate is 0.4 bit/s/Hz (=40 Gbit/s ÷100 GHZ).

An interleaver is an optical multiplexer/demultiplexer having a function to demultiplex a signal light group with a certain wavelength interval into even channels and odd channels, and generate a signal group with a double wavelength interval, or a function to multiplexing the even channels and the odd channels and generate a signal group with a ½ wavelength interval.

On the other hand, there is at WDM optical communication system to efficiently accommodate signal lights with a plurality of bit rates by arraying the signal lights with different wavelength intervals (see Japanese Patent Application Laid-Open No. 2002-112294, for example).

According to this WDM communication system, in the case of 40 Gbit/s signals, for example, four wavelength interval signal components are bundled into one channel, and in the case of 10 Gbit/s signals, two wavelength interval signal components are bundled into one channel, so that signals for each bit rate channel are generated. And 40 Gbit/s signals are arrayed at 100 GHz intervals, and 10 Gbit/s signals are arrayed at 50 GHz intervals, and they are transmitted respectively.

Before upgrading this system, in other words, in the system which wavelength-multiplexes and transmits 10 Gbit/s signal lights at 50 GHz intervals, if a part of the signal lights are directly changed into 40 Gbit/s signals, and these wavelength division multiplexing signals (WDM signals) are multiplexed/demultiplexed by a normal interleaver with 50 GHz/100 GHz intervals, the transmission quality deteriorates. This is because the spectrum width (bandwidth) of 40 Gbit/s signal lights is wider than that of 10 Gbit/s signal lights, so the signal components of 40 Gbit/s leak into the adjacent channels (cross-talk), and also because the spectrum of the 40 Gbit/s signals itself is restricted by the interleaver.

If an interleaver with a 100 GHz/200 GHz interval, which is used for 40 Gbit/s transmission, is used, cross-talk or transmission quality problems do not occur, but the spectral efficiency becomes lower, 0.25 bit/s/Hz, since 10 Gbit/s signal lights are also transmitted with 100 GHz intervals, which cancels out the effect of upgrading.

Also the signal wavelengths of a conventional system are arrayed in a grid with equal intervals as specified in ITU-T recommendations, so it is preferable not to change the conventional wavelength array, such as a 50 GHz interval or a 100 GHz interval, when upgrading.

Also the spectrum width of optical signals with respective wavelengths differ in the same way when the modulation scheme is different, such as RZ, NRZ and CSRZ, even if the bit rate is the same. Therefore this case can be considered in the same way as the case of increasing the speed of the bit rate.

SUMMARY OF THE INVENTION

With the foregoing in view, it is an object of the present invention to provide a WDM transmission system that can multiplex or demultiplex and transmit signal lights, where signal lights with different signal bandwidths are wavelength-division multiplexed because the transmission speed or the modulation scheme is different, without deteriorating the transmission quality very much, and an optical transmitter and an optical receiver constituting this system.

It is another object of the present invention to, provide a WDM transmission system, optical transmitter and optical receiver of which the spectral efficiency is high. It is still another object of the present invention to provide a WDM transmission system, optical transmitter and optical receiver that allow use of a specified frequency grid.

To achieve the above objects, the present invention is a wavelength division multiplexing transmission system for transmitting wavelength division multiplexing signals where signal lights with different signal bandwidths are wavelength division-multiplexed, comprising at least one of a demultiplexing unit for demultiplexing the wavelength division multiplexing signals and a multiplexing unit for multiplexing a plurality of signal lights that are input, wherein the demultiplexing unit further comprises a plurality of output ports for outputting the demultiplexed signal lights, and each output port has transmission characteristics to be set such that the bandwidth of the transmission band where the light transmits and the bandwidth of the non-transmission band where the light does not transmit are different, and the transmission band is substantially the same as the signal band of the signal lights that are output from the output port out of the received wavelength division multiplexing signals and the multiplexing unit further comprises a plurality of input ports for inputting the plurality of signal lights, and filters and multiplexes the signal lights that are input from the plurality of input ports respectively based on the transmission characteristics of each input port, and each of the input ports has a transmission band which substantially matches with the signal band of the signal lights to be input to the input port.

The optical receiver according to the present invention is an optical receiver for receiving wavelength division multiplexing signals where signal lights with different signal bandwidths are wavelength division-multiplexed, comprising a demultiplexing unit for demultiplexing the wavelength division multiplexing signals and outputting the demultiplexed signal lights from a plurality of output ports, wherein each output port has transmission characteristics to be set such that the bandwidth of the transmission band where the light transmits and the bandwidth of the non-transmission band where light does not transmit are different, and the transmission band substantially matches with the signal band of the signal lights that are output from the output port out of the received wavelength division multiplexing signals.

The optical transmitter according to the present invention is an optical transmitter for wavelength division multiplexing and transmitting a plurality of signal lights with different signal bandwidths, comprising a multiplexing unit that further comprises a plurality of input ports for inputting the plurality of signal lights and that filters and multiplexes the signal lights which are input from the plurality of input ports respectively based on the transmission characteristics of each port, wherein each input port of the multiplexing unit has a transmission band which substantially matches with the signal band of the signal lights to be input to the input port.

According to the present invention, the signal lights which are output from each output port of the demultiplexing unit are filtered by the transmission characteristics with a transmission band which substantially matches with the signal band of the signal lights to be demultiplexed/output to each output port, then are output. Therefore even if the signal lights with different signal bandwidths are multiplexed, each signal light can be demultiplexed and output in a status without much quality deterioration, such as cross-talk and the removal of part of a signal component by filtering. Therefore upgrading to a mixed system, where signal lights with a plurality of different transmission speeds, can be implemented in a status without much deterioration of the transmission quality. This is the same for the case when signal lights modulated by different modulation scheme are multiplexed.

Also according to the present invention, each input port of the multiplexing unit has a transmission band which substantially matches with the signal band of the signal lights to be input to the input port, and the signal lights to be input to each input port are filtered and multiplexed based on the transmission characteristics of each input port. Therefore only signal components can be multiplexed, and other noise can be removed.

DESCRIPTION OF THE PREFERRED EMBODIMENTS

The wavelength division multiplexing transmission system (WDM transmission system), where 10 Gbit/s and 40 Gbit/s signal lights are mixed, which is constructed by upgrading the WDM transmission system of which signal lights with respective wavelengths are 10 Gbit/s, will be described herein below.

<First Embodiment>

Figure 1A:
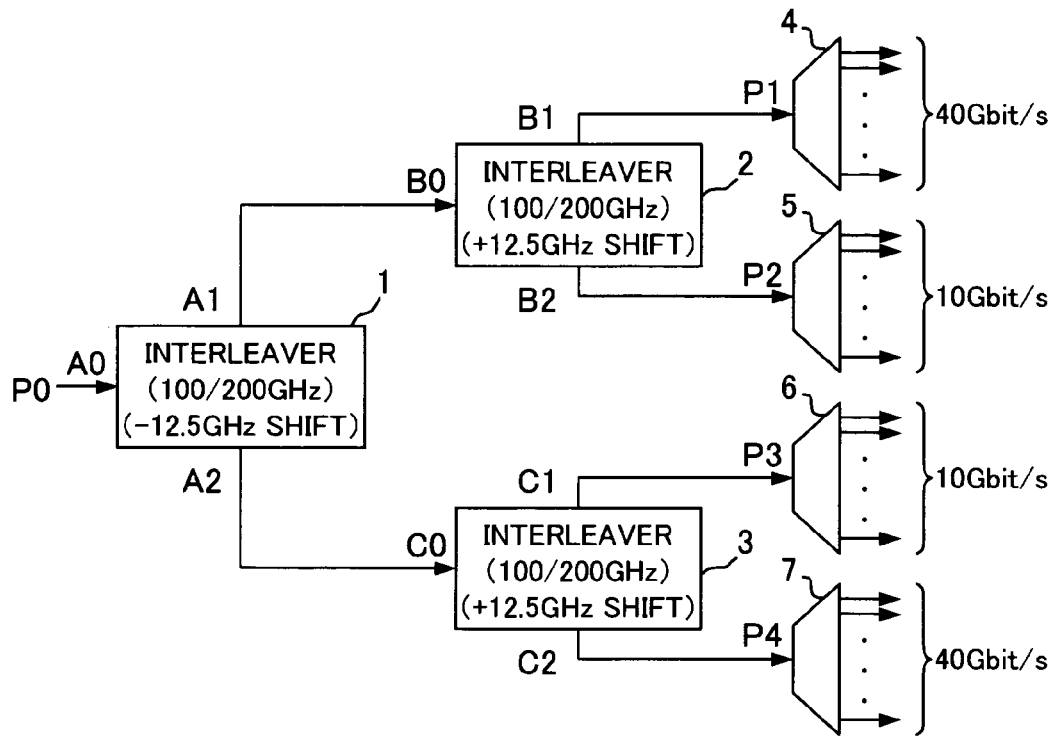
FIG. 1A is a block diagram depicting the configuration of the demultiplexing unit of the WDM transmission system according to the first embodiment of the present invention.
Figure 1B:
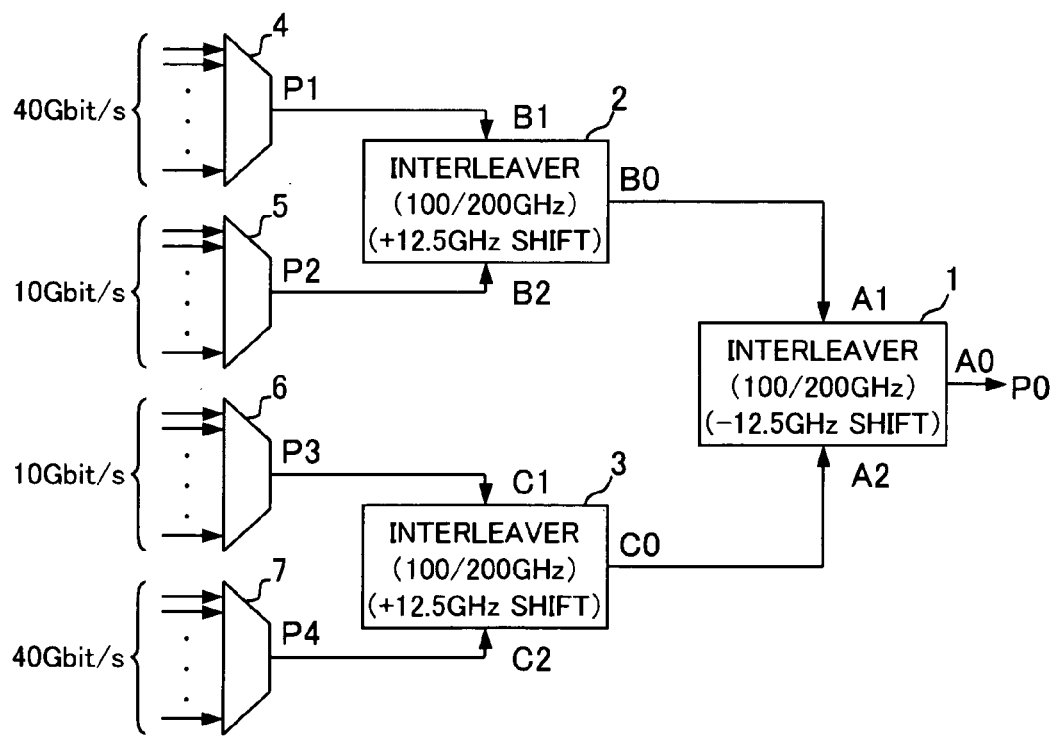
FIG. 1B is a block diagram depicting the configuration of the multiplexing unit of this WDM transmission system.

FIG. 1A is a block diagram depicting the configuration of the demultiplexing unit of the WDM transmission system according to the first embodiment of the present invention, and FIG. 1B is a block diagram depicting the configuration of the multiplexing unit of this WDM transmission system.

Figure 2:
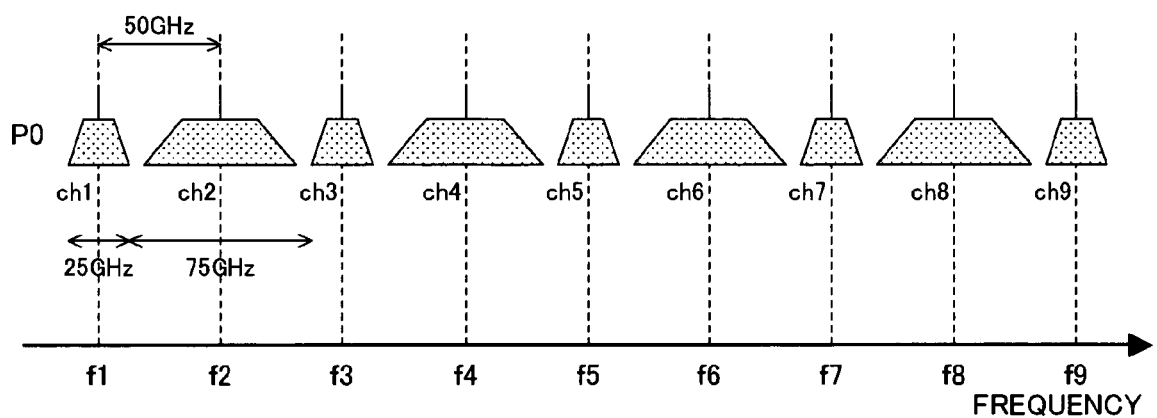
FIG. 2 is a diagram depicting the signal light group to be input to the demultiplexing unit or to be multiplexed by the multiplexing unit according to the first embodiment of the present invention arrayed on the frequency axis.

FIG. 2 shows the signal light group (WDM signals) P0, which is input to the demultiplexing unit or is multiplexed by the multiplexing unit, arrayed on the frequency axis.

The demultiplexing unit is installed in ant optical receiver (optical reception terminal) and a relay of the WDM transmission system. The multiplexing unit is installed in an optical transmitter (optical transmission terminal) and a relay of the WDM transmission system.

In the following description, the configuration of the demultiplexing unit will be described in detail, and for the configuration of the multiplexing unit which can be considered in the same way as the demultiplexing unit with only the input/output relationship reversed, the same reference symbols are denoted for corresponding portions, for which description will be simplified. This is the same for the later mentioned second to seventh embodiments.

At first, the WDM signal will be described with reference to FIG. 2. The abscissa in FIG. 2 is the frequency axis, and the frequencies f1-f9 have a grid with a 50 GHZ (F=50 GHz) frequency interval specified by the ITU-T recommendation (hereafter called the ITU-T grid).

The WDM signals P0 are an example of WDM signals where 10 Gbit/s and 40 Gbit/s are mixed. In these WDM signals P0, 10 Gbit/s signal lights are arrayed in the odd channels, and 40 Gbit/s signal lights are arrayed in the even channels. The signal lights in channel ch1 are arrayed in frequency f1, and signal lights in channel ch2 are arrayed in frequency f2. Channels in channel ch3 or later are also sequentially arrayed on the ITU-T grid in frequency f3 or later. Here nine channels, ch1-ch9 are shown, but this is merely an example, and more channels or fewer channels than this may be multiplexed.

In the WDM signals P0, the transmission bandwidth (spectrum width) F1 of the 10 Gbit/s signal lights is set to 25 GHz, and the transmission bandwidth (spectrum width) F2 of the 40 Gbit/s signal lights is set to 75 GHz so that the adjacent 10 Gbit/s signal lights and the 40 Gbit/s signal lights do not overlap.

As described in the section on "Description of the Related Art", the transmission bandwidth of the 10 Gbit/s signal lights is generally 50 GHz in the case of the 10 Gbit/s WDM transmission systems currently commercialized. In the case of 40 Gbit/s WDM transmission systems for which research and development are in-progress, 100 GHz is being considered as the transmission bandwidth of the 40 Gbit/s signal lights.

According to the present embodiment, on the other hand, a narrower bandwidth is assigned, such as 25 GHz for 10 Gbit/s signal lights and 75 GHz for 40 Gbit/s signal lights. Due to the following reasons (1)-(3), signal lights with sufficient quality can be transmitted with such a bandwidth.

(1) The spectrum width (bandwidth) of the signals of a 40 Gbit/s NRZ (Non-Return to Zero) modulation scheme is approximately 60 GHz, and that of 10 Gbit/s NRZ signals is approximately 15 GHz. Therefore even if the bandwidth of 40 Gbit/s signal lights is set to 75 GHz and the bandwidth of 10 Gbit/s signal lights is set to 25 GHz, these signals can be sufficiently transmitted in a status without much quality deterioration.

Figures 5A, 5B:
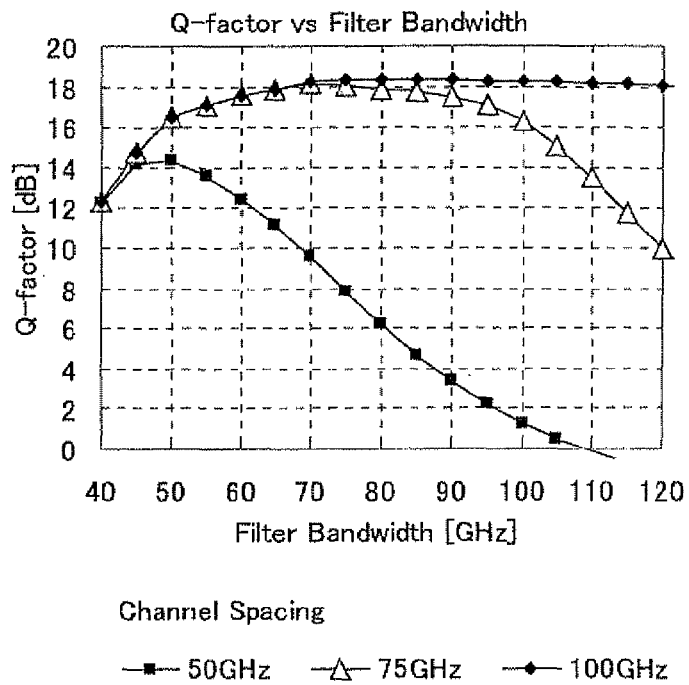
FIG. 5A is a graph showing the relationship between the filter bandwidth and the Q factor when the frequency interval between signal lights is changed to 50 GHz, 75 GHz and 100 GHz in the 40 Gbit/s WDM transmission system.
FIG. 5B is a table showing the relationship of the bit rate, wavelength interval and spectral efficiency.

(2) FIG. 5A is a graph showing the relationship between the filter bandwidth and the Q factor in a 40 Gbit/s WDM transmission system when the frequency interval (wavelength interval) between signal lights is changed as 50 GHz, 75 GHz and 100 GHz. As this graph shows, the deterioration of the Q factor, due to the cross-talk of adjacent channels and the band restriction of the filter is 0.3 dB or less with respect to the 100 GHz frequency interval when the wavelength interval and the filter bandwidth, are both 75 GHz. Therefore, even if the frequency interval is 75 GHz, signals can be transmitted with a quality equivalent to that of the case of 100 GHz.

(3) In the paper by G. Vareille, et al, "1.5 terabit/s submarine 4000 km system validation over a deployed line with industrial margins using a 25 GHz channel spacing and NRZ format over NZDSF", (WP 5, OFC 2002), for example, the transmission of 10 Gbit/s NRZ type WDM signals with a 25 GHz interval has been implemented.

Therefore in the present embodiment, it is assumed that 10 Gbit/s signal lights and 40 Gbit/s signal lights are transmitted with a 25 GHz and 75 GHz bandwidth respectively.

According to this signal array, each signal light can be arrayed on an ITU-T grid and can be transferred, which is an advantage. Also in the WDM signals P0, spectral efficiency becomes 0.5 Gbit/s/Hz by mixing 10 Gbit/s and 40 Gbit/s, as shown in FIG. 5B, and a spectral efficiency that is higher than the spectral efficiency 0.4 Gbit/s/Hz, when the 40 Gbit/s signals are transmitted with a 100 GHz bandwidth, can be achieved.

Since the relationship of the ITU-T grid interval (F=50 GHz)≧{transmission bandwidth of 10 Gbit/s signal (F1=25 GHz)+transmission bandwidth of 40 Gbit/s signal (F2=75 GHz)}÷2, the cross-talk problem is, minor even if the signals are arrayed in an ITU-T grid where 10 Gbit/s signals and 40 Gbit/s signals are next to each other.

Now the demultiplexing unit will be described with reference to FIG. 1A. The demultiplexing unit is comprised of the interleavers 1-3 and the demultiplexers 4-7.

The demultiplexers 4-7 are 1:N channels (N is an integer of 2 or higher) of demultiplexers with a 200 GHz frequency interval, which demultiplexes the WDM signals, which are input, into signals with respective wavelengths (each frequency), and outputs the signals. The central frequency of the transmission band of the demultiplexer 4 is set to frequencies f2, f6, ... (frequency f[4i-2], i is an integer of 1 or higher), and the central frequency of the transmission band of the demultiplexer 5 is set to frequencies f1, f5, . . . (frequency f [4*i*-3]). The central frequency of the transmission band of the demultiplexer 6 is set to frequencies f3, f7, . . . (frequency f [4*i*-1]), and the central frequency of the demultiplexer 7 is set to frequencies f4, f8, . . . (frequency f [4*i*]). The bandwidth of the transmission band of each demultiplexer is 100 GHz. For the demultiplexers 4-7, a known AWG (Arrayed Waveguide Grating) filter and a multi-layer film filter, for example, can be used.

The interleavers 1-3 are optical multiplexer/demultiplexers that demultiplex the wavelength division-multiplexing signal light group (WDM signals), which are input, into the signal light group in even channels and the signal light group in odd channels so as to expand the frequency interval (wavelength interval) to double, or multiplexes the signal light groups in the even channels and the odd channels so as to reduce the frequency interval (wavelength interval) to ½ according to the reversed input/output relationship. For these interleavers 1-3 as well, a known interleaver can be used.

Here a 100 GHz frequency interval is expanded to a 200 GHz frequency interval, or a 200 GHz frequency interval is reduced to a 100 GHZ frequency interval. For example, the interleaver 1 demultiplexes the signal light group with a 100 GHZ interval that is input from the port A0 to the signal light group in even channels and the light signal group in odd channels with a 200 GHz interval, and outputs these two light signal groups to the ports A1 and A2 respectively. The interleaver 1, on the other hand, multiplexes the two signal groups with a 200 GHZ interval, that are input from the ports A1 and A2, into one light signal group with a 100 GHz interval, and outputs it from the port A0. This is the same for the interleavers 2 and 3.

Figure 3:
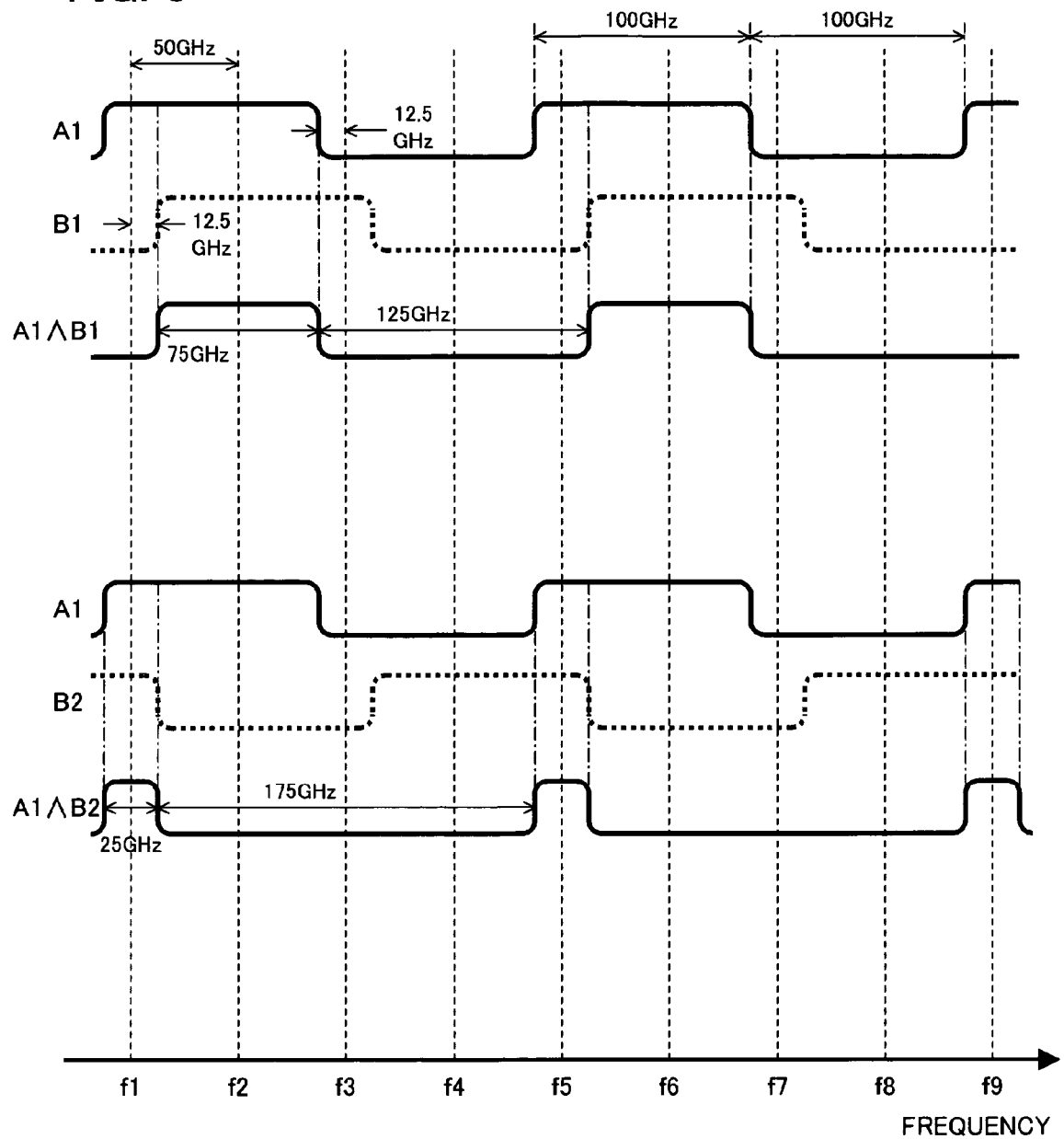
FIG. 3 is a diagram depicting the transmission characteristics of the interleaver according to the first embodiment of the present invention.

FIG. 3 shows the transmission characteristics at the port (output port) A1 side when the interleaver 1 is used standalone (graph A1), the transmission characteristics at the port B1 side when the interleaver 2 is used standalone (graph B1), the transmission characteristics at the port B2 side when the interleaver 2 is used standalone (graph B2), the transmission characteristics at the port B1 side of the interleaver 2 when the port A1 of the interleaver 1 is connected to the port B0 of the interleaver 2 and used (graph A1 Λ B1), and the transmission characteristics of the port B2 side of the interleaver 2 when the port A1 of the interleaver 1 is connected to the port B0 of the interleaver 2 and used (graph A1 Λ B2). In each graph, the abscissa indicates the frequency and the ordinate indicates the light transmittance.

The interleaver 3 also has the same transmission characteristics as the interleaver 2, although this is not shown in FIG. 3.

The convex portion of the graph of each transmission characteristic indicates the frequency band where light transmits (transmission band), and the concave portion of the graph indicates the frequency band where light does not transmit (non-transmission band, filtered band). The transmission band and the non-transmission band both have a 100 GHz band width, and are alternately repeated with a 200 GHz cycle.

As the graphs B1 and B2 show, the two ports (output ports) B1 and B2 of the interleaver 2 have opposite transmission characteristics from each other. In the same way, the ports (output ports) A1 and A2 of the interleaver 1 have opposite characteristics from each other, and the ports C1 and C2 of the interleaver 3 have opposite characteristics from each other.

As graph A1 shows, the central frequency of the transmission band at the port A1 side of the interleaver is shifted 12.5 GHz to the lower frequency side (that is, -12.5 GHz) from the frequencies f2, f6, . . . (200 GHz interval) of the ITU-T grid, (in other words, shifted 37.5 GHz to the higher frequency side (that is +37.5 GHZ) from the frequencies f1, f5, . . . ). Here it is assumed that the shift amount is -50 GHz<S<50 GHz.

In the same way, the central frequency of the non-transmission band at the port A1 side of the interleaver 1 is shifted -12.5 GHz from the frequencies f4, f8, . . . (200 GHz interval) (in other words, shifted 37.5 GHz to the higher frequency side (that is +37.5 GHZ) from the frequencies f3, f7, . . . ).

Therefore the boundary of the transmission band and the non-transmission band of the interleaver 1 (rise edge and fall edge of the graph) is shifted -12.5 GHz from the frequencies f1, f3, . . . (100 GHz interval) of the ITU-T grid.

On the other hand, as graph B1 shows, the central frequency of the transmission band at the port B1 side of the interleaver 2 is shifted +12.5 GHz from the frequencies f2, f6, . . . of the ITU-T grid. The central frequency of the non-transmission band at the port B1 side of the interleaver 2 is shifted +12.5 GHz from the frequencies f4, f8, . . . of the ITU-T grid.

Therefore the boundary between the transmission band and the non-transmission band (rise edge and fail edge of the graph); of the interleaver 2 also shifts +12.5 GHz from the frequencies f1, f3, . . . (100 GHz interval) of the ITU-T grid. The central frequency of the transmission band and the non-transmission band of the interleaver 3 also shift respectively in the same way as the interleaver 2.

Such a positioning of the central frequency can be performed by adjusting the temperature of the interleavers 1-3. For the temperature adjustment of the interleavers 1-3, 3, a thermostat, for example, can be used.

As the graph A1 Λ B1 shows, by connecting the output port A1 of the interleaver 1 to the input port B0 of the interleaver 2, the transmission band of the output port B1 becomes the overlapping portion of the transmission bands of the interleavers 1 and 2, and the non-transmission band of the output port B1 becomes the portion of the non-transmission band of at least one of the interleavers 1 and 2.

Therefore the transmission bandwidth of the graph A1 Λ B1 becomes 75 GHz, and the non-transmission bandwidth becomes 125 GHz and the start frequency (rise edge) of the transmission band shifts +12.5 GHz from the frequencies f1, f5, . . . (200 GHz interval) of the ITU-T grid.

Also as the graph A1 Λ B1 shows, by connecting the output port A1 of the interleaver 1 to the input port B0 of the interleaver 2, the transmission bandwidth of the output port B2 becomes 25 GHz and the non-transmission bandwidth becomes 175 GHz, and the start frequency (rise edge) of the transmission band shifts -12.5 GHz from the frequencies f1, f5, . . . (200 GHz interval) of the ITU-T grid.

By connecting two interleavers, where the central frequency of the transmission band (non-transmission band) is shifted from the ITU-T grid, in a series, a filter (interleaver), which has an arbitrary start frequency and an arbitrary transmission bandwidth, can be constructed. As a result, an interleaver (filter) with an unequal interval, where the transmission bandwidth and the non-transmission bandwidth are not the same, can be constructed.

Figure 4:
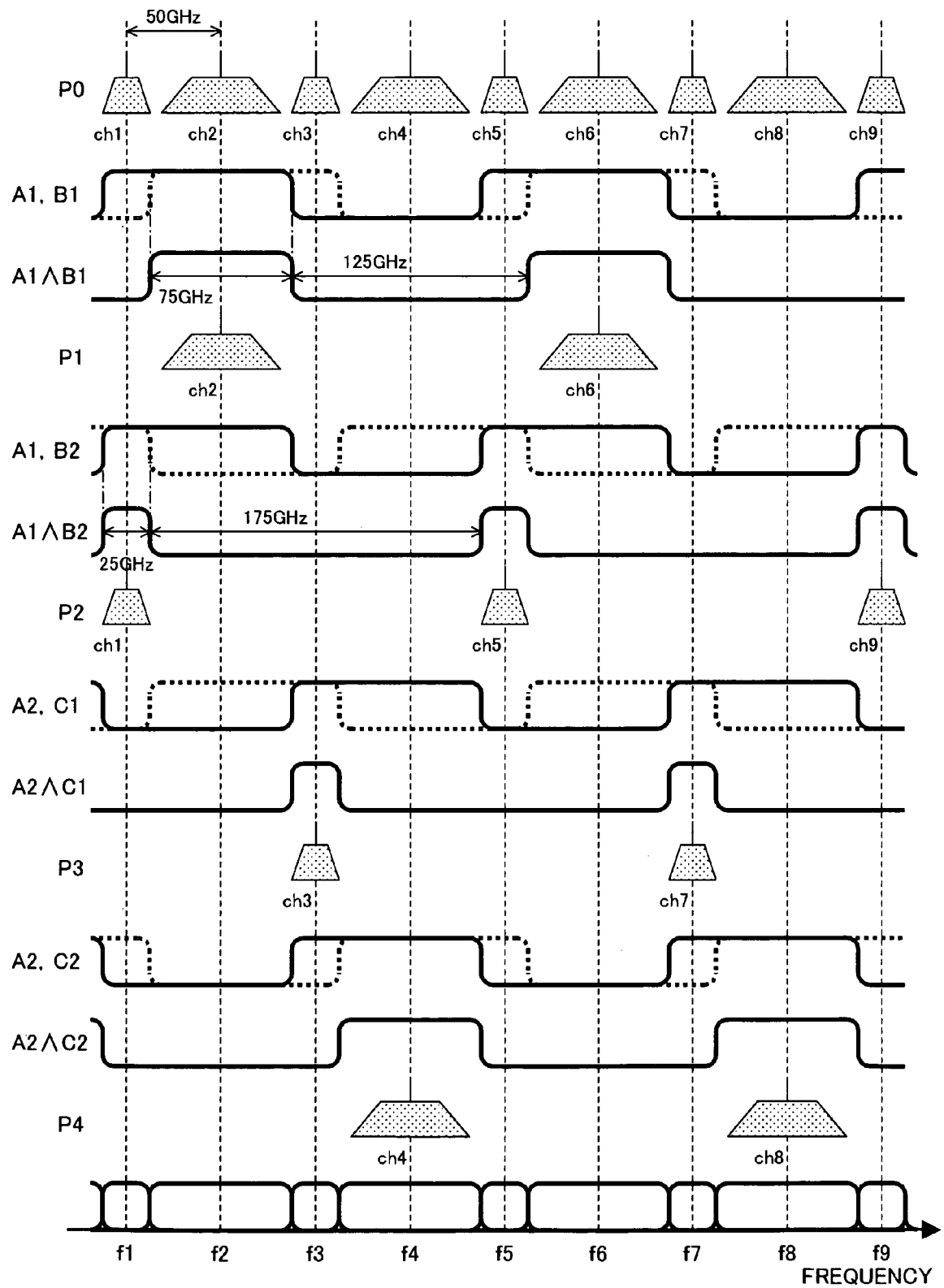
FIG. 4 is a diagram depicting the transmission characteristics of the interleaver according to the first embodiment of the present invention and the status of the WDM signals being filtered by the interleaver.

FIG. 4 shows the transmission characteristics of the interleavers 1-3 and the combinations of these interleavers, and the status when the light signal group (WDM signals) to be input to the input port A0 of the interleaver 1 is filtered by the interleavers 1-3. In FIG. 4, the abscissa indicates the frequency.

The WDM signal P0 is shown at the very top level of FIG. 4.

In the graph A1, B1 at the second level in FIG. 4, the transmission characteristics at the output port A1 side of the interleaver 1 is shown by a solid line, and the transmission characteristics at the port B1 side of the interleaver 2 is shown by a broken line. The graph A1 ∧ B1 at the third level shows the transmission characteristics at the output port B1 side of the interleaver 2 when the port A1 of the interleaver 1 is connected to the input port B0 of the interleaver 2, as described with reference to FIG. 3. This, is the same in the graph for A1, B2 at the fifth level and for A1 ∧ B1 at the sixth level.

The transmission band of the graph A1 ∧ B1 has a 75 GHz bandwidth, of which the center is the ITU-T grid (frequencies f2, f6, . . . ), where 40 Gbit/s channels ch2, ch6, . . . (channel ch [4$i$-2]) with a 75 GHz bandwidth are arrayed. The transmission band A1 ∧ B2 has a 25 GHz bandwidth, of which the center is the ITU-T grid (frequencies f1, f5, . . . ), where 10 Gbit/s channels ch1, ch5, . . . (channel ch [4$i$-3]) with a 25 GHz bandwidth are arrayed.

Therefore when the WDM signals P0 pass through the interleavers 1 and 2, only signal lights in the 40 Gbit/s channels, ch [4$i$-2], are output from the output port B1 of the interleaver 2, as the WDM signals P1 in FIG. 4 shows, and only signal lights in the 10 Gbit/s channels, ch [4$i$-2], are output from the output-port B2 of the interleaver 2, as the WDM signals P2 shows.

The transmission band of the graph A2 ∧ C1 has a 25 GHz bandwidth, of which the center is the ITU-T grid (frequencies f3, f7, . . . ), where 10 Gbit/s channels ch3, ch7, . . . (channel ch [4$i$-1]) with a 25 GHZ transmission bandwidth are arrayed. The transmission band of the graph A2 ∧ C2 has a 75 GHz bandwidth, of which the center is the ITU-T grid (frequencies f4, f8, . . . ), where 40 Gbit/s channels, ch4, ch8, . . . (channel ch [4$i$]), with a 75 GHz transmission bandwidth are arrayed.

Therefore when the WDM signals P0 pass through the interleavers 1 and 3, only signal lights in 10 Gbit/s channels, ch [4$i$-1], are output from the output port C1 of the interleaver 3, out of the WDM signals P0, as the WDM signals P3 show, and only signal lights in 40 Gbit/s channels, ch [4$i$], are output from the output port C2 of the interleaver 3, as the WDM signals P4 shows.

In this way, 40 Gbit/s signal lights are filtered by the unequal interval interleavers with a 75 GHz transmission bandwidth, which is comprised of two interleavers of which the central frequencies are shifted. 10 Gbit/s signal lights are filtered by the unequal interval interleavers with a 25 GHz transmission bandwidth, which is comprised of a combination of the two interleavers of which the central frequencies are shifted. Therefore signals in each channel, 40 Gbit/s and 10 Gbit/s, are output in a status without much quality deterioration, such as cross-talk and the loss of a signal component.

At the lowest level in FIG. 4, a graph when A1 ∧ B1, A1 ∧ B2, A2 ∧ C1 and A2 ∧ C2 are combined, is shown.

The WDM signals P1 and P2, which are output from the output ports B1 and B2 of the interleaver 2 respectively, are input to the demultiplexers 4 and 5 respectively, and are demultiplexed into signal lights in each channel (see FIG. 1). The WDM signals P3 and P4, which are output from the output ports C1 and C2 of the interleaver 3, are input to the demultiplexers 6 and 7 respectively, and are demultiplexed into lights signals in each channel (see FIG. 1).

Now the multiplexing unit shown in FIG. 1B will be described in brief.

In the multiplexer 4, signal lights in the channel ch [4$i$-2] are input, and are multiplexed into the WDM signals P1. The WDM signals P1 are input to the input port B1 of the interleaver 2. In the multiplexer 5, signal lights in the channel ch [4$i$-3] are input, and are multiplexed into the WDM signals P2. The WDM signals P2 are input to the input port B2 of the interleaver 2. In the multiplexer 6, the signal lights in the channel ch [4$i$-1] are input, and are multiplexed into the WDM signals P3. The WDM signals P3 are input to the input port C1 of the interleaver 3. In the multiplexer.7, signal lights in the channel ch [4$i$] are input, and are multiplexed into the WDM signals P4. The WDM signals P4 are input to the input port C2 of the interleaver 3.

The WDM signals P1 and P2 pass through the interleaver 2, and are filtered and multiplexed based on the transmission characteristics of the interleaver 2 (graphs for B1 and B2 in FIG. 4), and are input to the input port A1 of the interleaver 1 from the output port B0.

The WDM signals P3 and P4 pass through the interleaver 3, and are filtered and multiplexed based on the transmission characteristics of the interleaver 3 (graphs for C1 and C2 in FIG. 4), and are input to the input port A2 of the interleaver 1 from the output port C0.

The WDM signals, which are input to the input ports A1 and A2 of the interleaver 1, are filtered based on the transmission characteristics of the interleaver 1 (see the graphs for A1 and A2 in FIG. 4), and are multiplexed into the WDM signals P0, and are output from the output port A0.

By filtering using each interleaver, noise, existing in areas other than bands where signal lights exist, can be removed.

According to the present embodiment, the 10 Gbit/s and 40 Gbit/s mixed system can be flexibly supported by adjusting the central frequency (central wavelength) of the interleaver. Even a change in the bit rate of the signal lights can be flexibly supported by adjusting the central frequency of the interleaver.

Even for the case when the modulation scheme (e.g. NRZ modulation scheme, RZ modulation scheme, CSRZ modulation scheme) of signal lights is changed, where the bandwidths of the signal lights change, this can be flexibly supported in the same way as the case of the bit rate being changed Second Embodiment In the second embodiment of the present invention, 10 Gbit/s signals and 40 Gbit/s signals are multiplexed/demultiplexed by a narrowband interleaver.

Figure 6A:
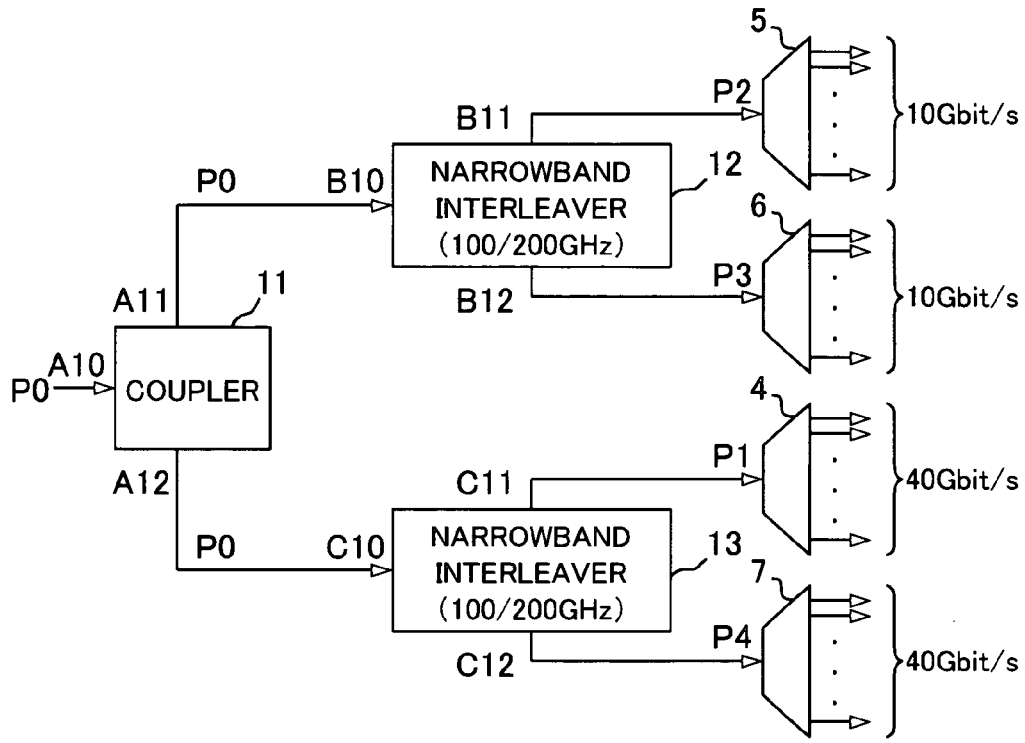
FIG. 6A is a block diagram depicting the configuration of the demultiplexing unit of the WDM transmission system according to the second embodiment of the present invention.
Figure 6B:
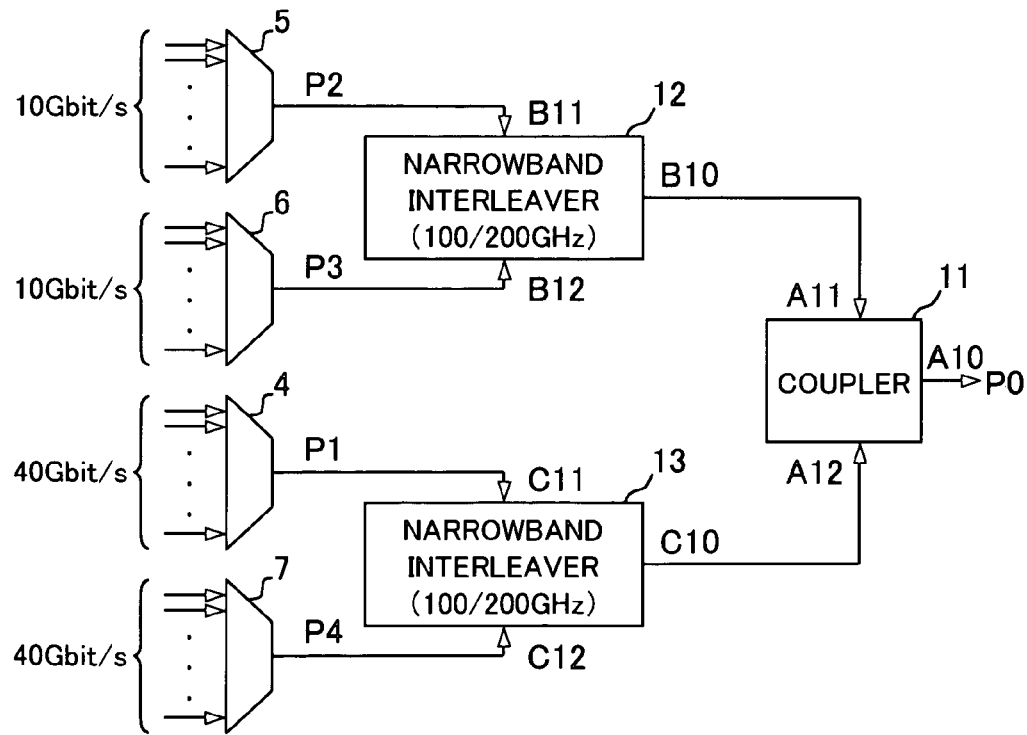
FIG. 6B is a block diagram depicting the configuration of the multiplexing unit of this WDM transmission system.

FIG. 6A is a block diagram depicting the configuration of the multiplexing unit of the WDM transmission section according to the second embodiment of the present invention, and FIG. 6B is a block diagram depicting the configuration of the multiplexing unit of the WDM transmission system.

The demultiplexing unit is comprised of a coupler 11, narrowband interleavers 12 and 13, and demultiplexers 4-7. Composing elements (demultiplexer 4-7) and WDM signals P0-P4, which are the same as the first embodiment shown in FIG. 1A, are denoted with the same reference symbols, for which description is omitted. However the array of the demultiplexers 4-6 and the WDM signals P1-P3 is different. This is the same for the multiplexing unit.

The coupler 11 outputs the WDM signals P0, which are input to the input port A10, directly to the two output ports A11 and A12. The WDM signals P0, which were output, are input to the input port B10 of the narrowband interleaver 12 and to the input port C10 of the narrowband interleaver 13.

The narrowband interleavers 12 and 13 are interleavers for demultiplexing signal lights with a 100 GHz interval into even channels and odd channels to generate WDM signals with a 200 GHz interval, and allowing only signal components with a predetermined bandwidth to pass by the internally installed narrowband filter, or allowing only signal components with a predetermined bandwidth to pass by the narrowband filter with a reversing input/output relationship, and multiplexing WDM signals in even channels and odd channels with a 200 GHz interval to generate signal lights with a 100 GHz interval.

Such a narrowband interleaver can be constructed by integrating a narrowband filter, for filtering each signal light constituting the WDM signals to be input with a predetermined transmission bandwidth, into a known interleaver, for example.

Figure 7:
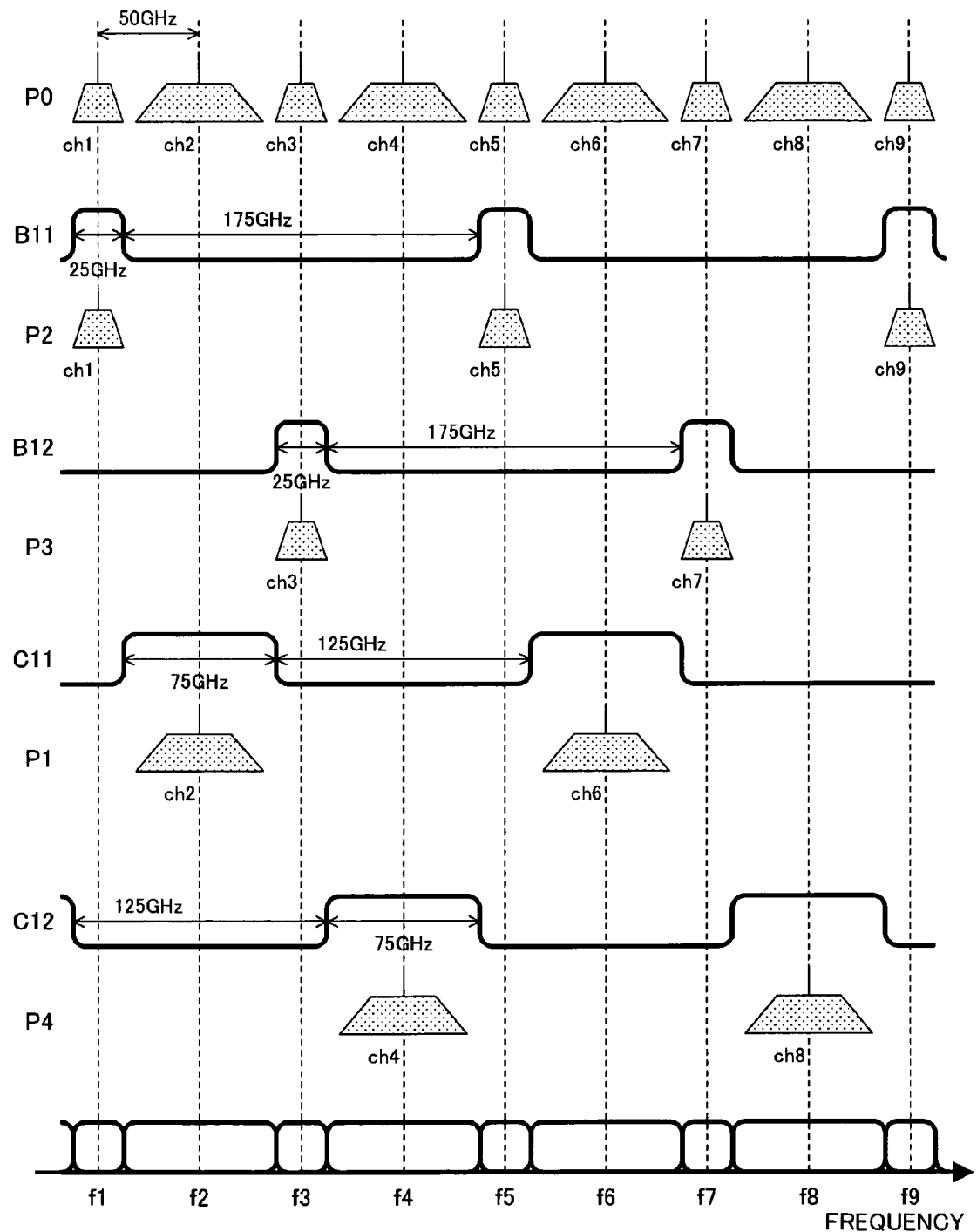
FIG. 7 is a diagram depicting the transmission characteristics of the interleaver according to the second embodiment, and the status of the WDM signals being filtered by the interleaver.

FIG. 7 shows the transmission characteristics of the interleavers 12 and 13, and the status when the WDM signals P0 are filtered by the interleavers 12 and 13.

The graph B11 shows the transmission characteristics of the narrowband interleaver 12 at the output port B11 side, and the graph B12 shows the transmission characteristics of the narrowband interleaver 12 at the output port B12 side. By the internally installed narrowband filter, the bandwidth of the transmission band of the narrowband interleaver 12 is reduced from 100 GHz to 25 GHz, and the bandwidth of the non-transmission band is expanded from 100 GHz to 175 GHz.

The central frequency of the transmission band at the port B11 side is set to the frequencies f1, f5 . . . of the ITU T grid. The central frequency of the transmission band at the port B12 side is set to the frequencies f3, f7, . . . of the ITU-T grid.

The graph C11 shows the transmission characteristics of the narrowband interleaver 13 at the output port C11 side, and the graph C12 shows the transmission characteristics of the narrowband interleaver 13 at the output port C12 side. For the narrowband interleaver 13 as well, the bandwidth of the transmission band at the output port C11 side and the C12 side is reduced from 100 GHz to 75 GHz, and the bandwidth of the non-transmission band is expanded from 100 GHz to 125 GHz by the internal narrowband filter. The central frequency of the transmission band at the port C11 side is set to the frequencies f2, f6, . . . of the ITU-T grid. The central frequency of the transmission band at the port C12 side is set to the frequencies f4, f8, . . . of the ITU-T grid.

By using such interleavers 12 and 13, only the WDM signals P2 in the channel ch [4$i$-3] are output from the output port B11, and only the WDM signals P3 in the channel ch [4$i$-1] are output from the output port B12. Also only the WDM signals P1 in the channel ch [4$i$-2] are output from the output port C11, and only the WDM signals P4 in the channel ch [4$i$] are output from the output port C12.

Now the multiplexing unit shown in FIG. 6B will be described in brief.

In the multiplexing unit 5, signal lights in the channel ch [4$i$-3] are input and are multiplexed into the WDM signals P2. The WDM signals P2 are input to the input port B11 of the narrowband interleaver 12. In the multiplexing unit 6, signal lights in the channel ch [4$i$-1] are input and are multiplexed into the WDM signals P3. The WDM signals P3 are input to the input port B12 of the interleaver 12. In the multiplexer 4, signal lights in the channel ch [4$i$-2] are input and are multiplexed into the WDM signals P1. The WDM signals P1 are input to the input port C11 of the interleaver 13. In the multiplexer 7, signal lights in the channel ch [4$i$] are input and are multiplexed into the WDM signals P4. The WDM signals P4 are input to the input port C12 of the interleaver 13.

The WDM signals P2 and P3 pass through the interleaver 12, so as to be filtered and multiplexed based on the transmission characteristics (graphs B11 and B12 in FIG. 7) of the interleaver 12, and be input to the input port A11 of the coupler 11 from the output port B10.

The WDM signals P1 and P4 pass through the interleaver 13, so as to be filtered and multiplexed based on the transmission characteristics (graphs C11 and C12 in FIG. 7) of the interleaver 13, and be input to the input port A12 of the coupler 11 from the output port C10.

The WDM signals, which are input to the input ports A11 and A12 of the coupler 11, are multiplexed into the WDM signals P0 and are output from the output port A0.

By filtering using each interleaver, noise, that exists in areas other than bands where the signal lights exist can be removed.

The coupler 11 of the multiplexing unit may be an interleaver.

According to the present embodiment, the 10 Gbit/s and 40 Gbit/s mixed system can be flexibly supported by adjusting the bandwidth of the narrowband filter installed in the interleaver. Even the change of the bit rate of signal lights can be flexibly supported by adjusting the bandwidth of the narrowband filter of the interleaver.

Even the case when the modulation scheme (e.g. NRZ modulation scheme, RZ modulation scheme, CSRZ modulation scheme) of signal lights is changed, where the bandwidth of the signal lights change, can be flexibly supported in the same way as the case of the bit rate being changed.

Third Embodiment

In the third embodiment of the present invention, 10 Gbit/s signals and 40 Gbit/s signals are multiplexed/demultiplexed by the interleaver and a demultiplexer (multiplexer).

Figure 8A:
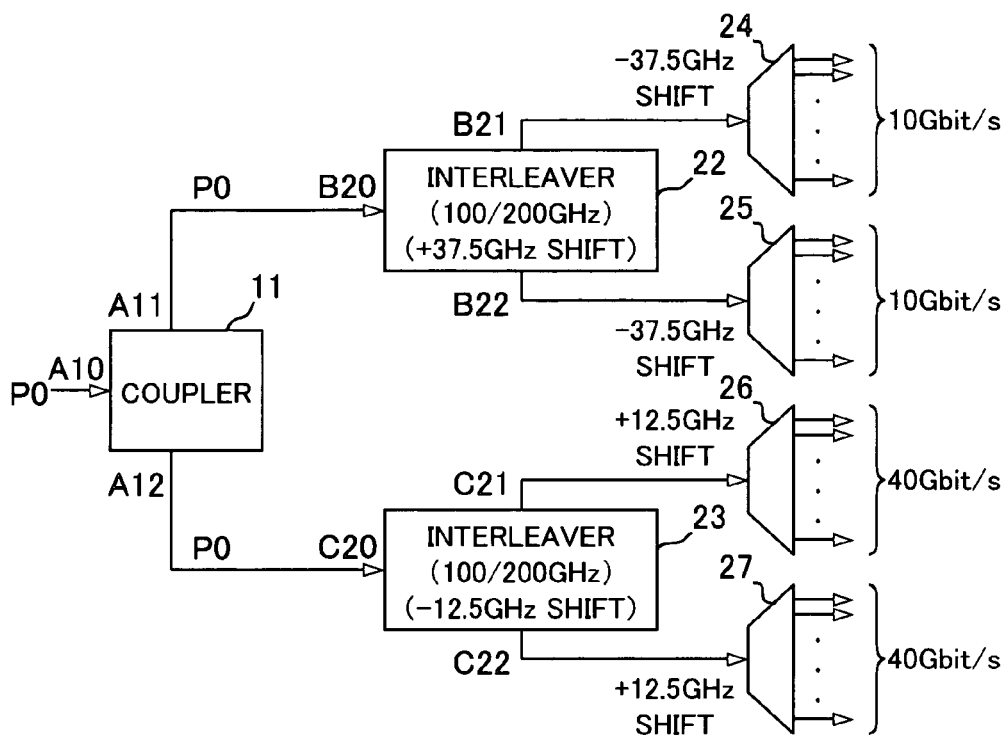
FIG. 8A is a block diagram depicting the configuration of the demultiplexing unit of the WDM transmission system according to the third embodiment of the present invention.
Figure 8B:
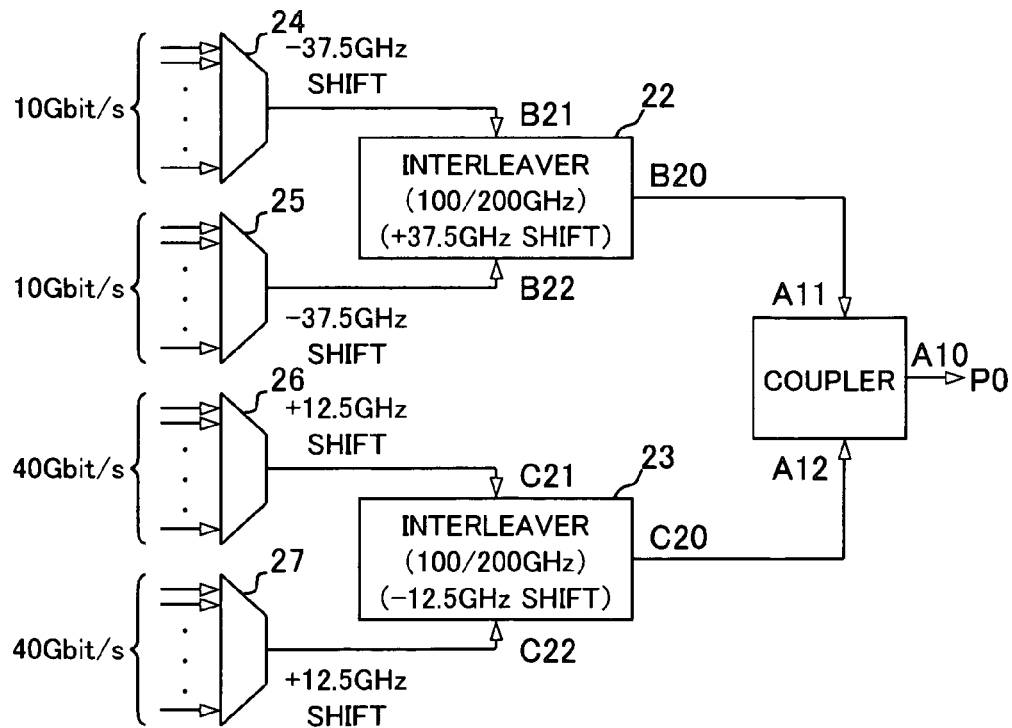
FIG. 8B is a block diagram depicting the configuration of the multiplexing unit of this WDM transmission system.

FIG. 8A is a block diagram depicting the configuration of the demultiplexing unit of the WDM transmission system according to the third embodiment of the present invention, and FIG. 8B is a block diagram depicting the configuration of the multiplexing unit of the WDM transmission system.

The multiplexing unit is comprised of a coupler 11, interleavers 22 and 23, and demultiplexers 24-27. The coupler 11 is the same as the coupler 11 in the second embodiment shown in FIG. 6. The signal lights P0 are also the same as that in the first and second embodiments.

The WDM signals P0, which were input to the input port A10 of the coupler 11, are input to the two interleavers 22 and 23 respectively from the output ports A11 and A12.

The interleavers 22 and 23 are interleavers similar to the interleavers 2 and 3 in the first embodiment, but the shift amount of the central frequency of the transmission band (and non-transmission band) is different from that in the first embodiment. The demultiplexers 24-27 are 1:N channel demultiplexers with a 200 GHz frequency, just like the demultiplexer 4 in the first embodiment, but the central frequency of the transmission band (and non-transmission band) is shifted from the ITU-T grid, which is different.

Figure 9:
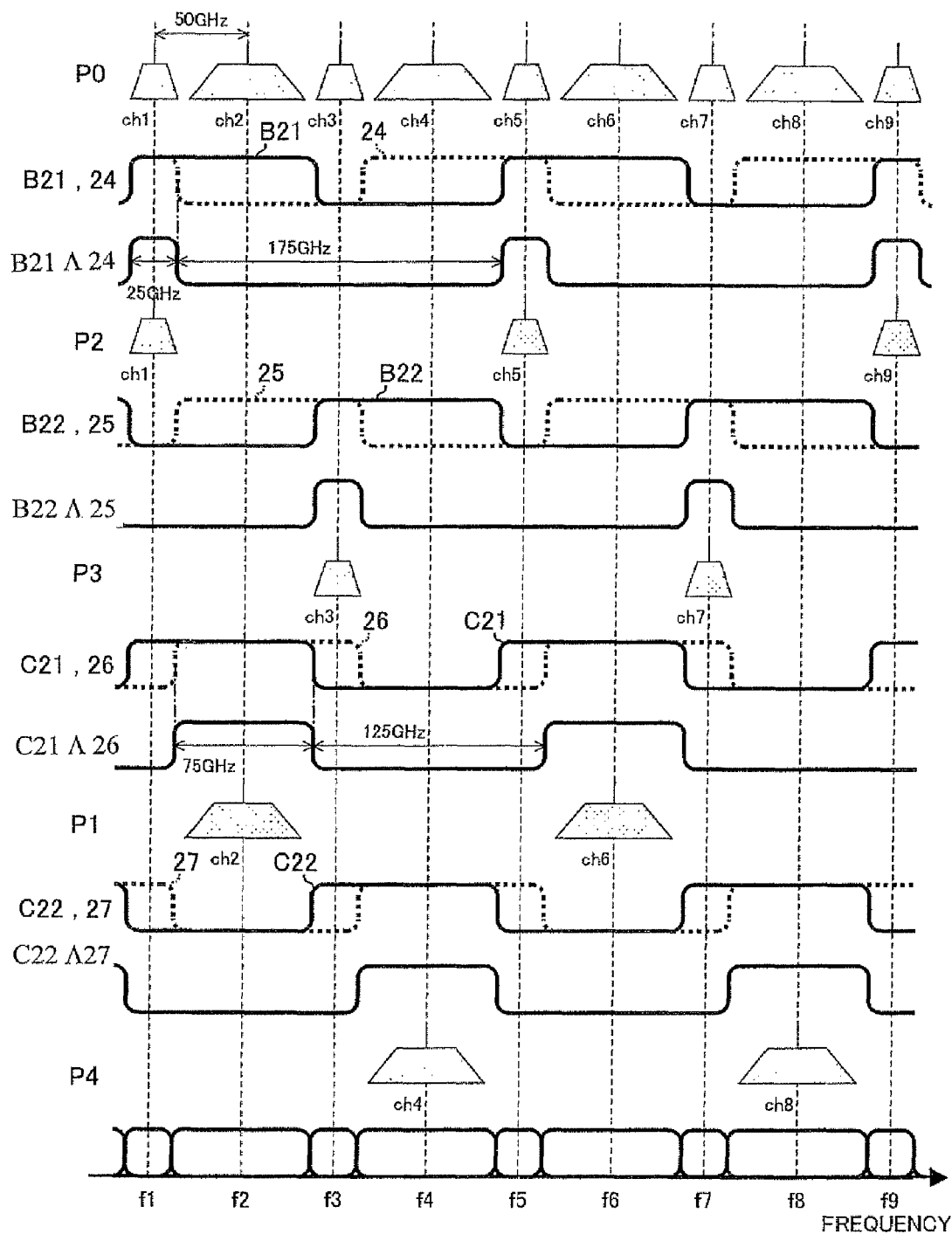
FIG. 9 is a diagram depicting the transmission characteristics of the interleaver and the demultiplexing unit according to the third embodiment of the present invention, and the status of the WDM signals being filtered by the interleaver.

FIG. 9 shows the transmission characteristics of the interleavers 22 and 23 and the demultiplexers 24-27, and the status when the WDM signals P0 are filtered by the interleavers 22 and 23.

The solid line graph B21 in the second level in FIG. 9 shows the transmission characteristics of the interleaver 22 at the port B21 side, and the broken line graph 24 shows the transmission characteristics of the demultiplexer 24. In the transmission characteristics at the port B21 side, the central frequency of the transmission band is shifted +37.5 GHz from the frequencies f1, f5, . . . The central frequency of the transmission band of the demultiplexer 24 is shifted −37.5 GHz from the frequencies f1, f5, . . . . Such a shift of the central frequency of the demultiplexer 24 can be implemented by adjusting the temperature of the demultiplexer 24, which can be constructed by a known AWG filter or a multi-layer film filter, using a thermostat, for example, just like the case of the interleaver. This is the same for the other demultiplexers 24-27.

Therefore by connecting the output port B21 to the demultiplexer 24, the interleaver (filter)/demultiplexer with an unequal interval with a 25 GHz bandwidth, where the central frequency of the transmission band is f1, f5, . . . (f[4$i$-3]), are constructed, as shown in the graph B21 Λ 24 in the third level. And the WDM signals P0 pass through the interleaver 22 and the demultiplexer 24, so that the 10 Gbit/s signal lights in the demultiplexed channels ch1, ch5, . . . (channel ch [4$i$-3]) are output from the demultiplexer 24.

As the solid line graph B22 in the fifth level shows, the transmission characteristics of the interleaver 22 at the output port B22 side are the opposite of the transmission characteristics at the output port B21 side, where the central frequency of the transmission band is shifted +37.5 GHz from the frequencies f3, f7, . . . (f [4$i$-1]). Also as the graph 25 shows, the transmission characteristics of the demultiplexer 25 are the opposite of the transmission characteristics of the demultiplexer 24, where the central frequency of the transmission band is shifted −37.5 GHz from the frequencies f3, f7, . . .

Therefore by connecting the output port B22 to the demultiplexer 25, the interleaver(filter)/demultiplexer with an unequal interval with a 25 GHz bandwidth, where the central frequency of the transmission band is f3, f7, . . . (f [4$i$-1]), are constructed as shown in the graph B22 Λ 25 in the sixth level. And the WDM signals P0 pass through the interleaver 22 and the demultiplexer 25, so that the 10 Gbit/s signal lights in the demultiplexed channels ch3, ch7, . . . (channel ch [4$i$-1]) are output from the demultiplexer 25.

As the solid line graph C21, in the eighth level shows, in the transmission characteristics at the port C21 side, the central frequency of the transmission band is shifted 12.5 GHz from the frequencies f2, f6, . . . The central frequency of the transmission band of the demultiplexer 26 is shifted +12.5 GHz from the frequencies f2, f6, . . .

Therefore by connecting the output port C21 to the demultiplexer 26, the interleaver(filter)/demultiplexer with an unequal interval with a 75 GHz bandwidth, where the central frequency of the transmission band is f2, f6, . . . (f [4$i$-2]) are constructed as shown in the graph C21 Λ 26. And the WDM signals P0 pass through the interleaver 23 and the demultiplexer 26, so that the 40 Gbit/s signal lights in the demultiplexed channels ch2, ch6, . . . (channel ch [4$i$-2]) are output from the demultiplexer 26.

As the solid line graph C22 shows, the transmission characteristics of the interleaver 23 at the output port C22 side are the opposite of the transmission characteristics at the output port C21 side, where the central frequency of the transmission band is shifted −12.5 GHz from the frequencies f4, f8, . . . (f [4$i$]). Also as the graph 27 shows, the transmission characteristics of the demultiplexer 27 are the opposite of the transmission characteristics of the demultiplexer 26, where the central frequency of the transmission band is shifted +12.5 GHz from the frequencies f4, f8, . . .

Therefore by connecting the output port C22 to the demultiplexer 27, the interleaver(filter)/demultiplexer with an unequal interval with a 75 GHz bandwidth, where the central frequency of the transmission band is f4, f8, . . . (f[4$i$]), are constructed as shown in the graph C22 Λ 27. And the WDM signals P0 pass through the interleaver 23 and the demultiplexer 27, so that the 40 Gbit/s signal lights in the demultiplexed channels ch4, ch8, . . . (channel ch [4$i$]) are output from the demultiplexer 27.

As FIG. 9 shows, the transmission characteristics of the interleaver 23 are the same as the transmission characteristics of the interleaver 22 as a result. The transmission characteristics of the interleaver and the demultiplexer may be reversed. For example, the transmission characteristics of the interleaver 22 at the output port B21 side may have the characteristics of the broken line graph 24 of the demultiplexer 24, and the transmission characteristics of the demultiplexer 24 may have the characteristics of the interleaver 22 at the output port B21 side.

Now the multiplexing unit shown in FIG. 8B will be described in brief.

In the multiplexing unit 24, 10 Gbit/s signal lights in the channel ch [4$i$-3] are input and are multiplexed into the WDM signals P2. The WDM signals P2 are input to the input port B21 of the interleaver 22. In the multiplexing unit 25, 10 Gbit/s signal lights in the channel ch [4$i$-1] are input and are multiplexed into the WDM signals P3. The WDM signals P3 are input to the input port B22 of the interleaver 22. In the multiplexer 26, the 40 Gbit/s signal lights in the channel ch [4$i$-2] are input and are multiplexed into the WDM signals P1. The WDM signals P1 are input to the input port C21 of the interleaver 23. In the multiplexer 27, 40 Gbit/s signal lights in the channel ch [4$i$] are input and are multiplexed into the WDM signals P4. The WDM signals P4 are input to the input port C22 of the interleaver 23.

The WDM signals P2 and P3 pass through the interleaver 22, so as to be multiplexed and input to the input port A11 of the coupler 11 from the output port B20. The WDM signals P1 and P4 pass through the interleaver 23, so as to be multiplexed and input to the input port A12 of the coupler 11 from the output port C20.

The signals which are input to the coupler 11 are multiplexed and output from the output port A10 as the WDM signals P0.

The signal lights constituting each WDM signal are filtered-based on the transmission characteristics of the multiplexers 24-27 and the interleavers 22 and 23, and the noise, that exists in areas other than the band where the signal lights exist, can be removed.

According to the present embodiment, the 10 Gbit/s and 40 Gbit/s mixed system can be flexibly supported by adjusting the central frequency (central wavelength) of the interleaver and the demultiplexer. Even the change of the bit rate of signal lights can be flexibly supported by adjusting the central frequency of the interleaver and the demultiplexer.

Even the case when the modulation scheme (e.g. NRZ modulation scheme, RZ modulation scheme, CSRZ modulation scheme) of signal lights is changed, where the bandwidth of the signal lights change, can be flexibly supported in the same way as the case of the bit rate being changed.

Fourth Embodiment

In the fourth embodiment of the present invention, 10 Gbit/s and 40 Gbit/s signal lights are multiplexed/demultiplexed by the narrowband multiplexer/demultiplexer and the narrowband interleaver.

Figure 10A:
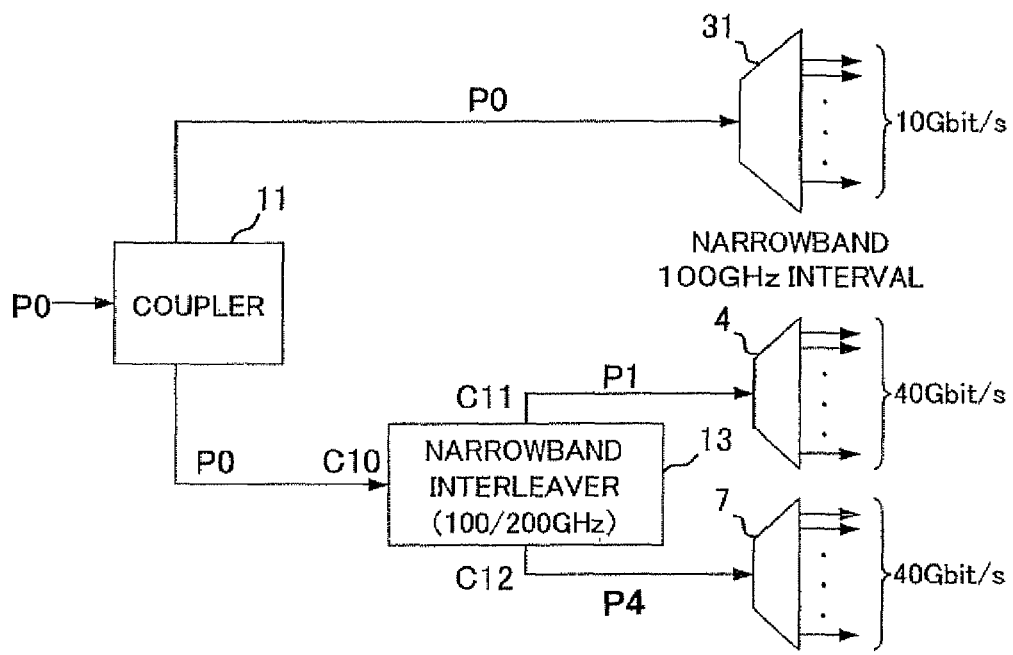
FIG. 10A is a block diagram depicting the configuration of the demultiplexing unit of the WDM transmission system according to the fourth embodiment of the present invention.
Figure 10B:
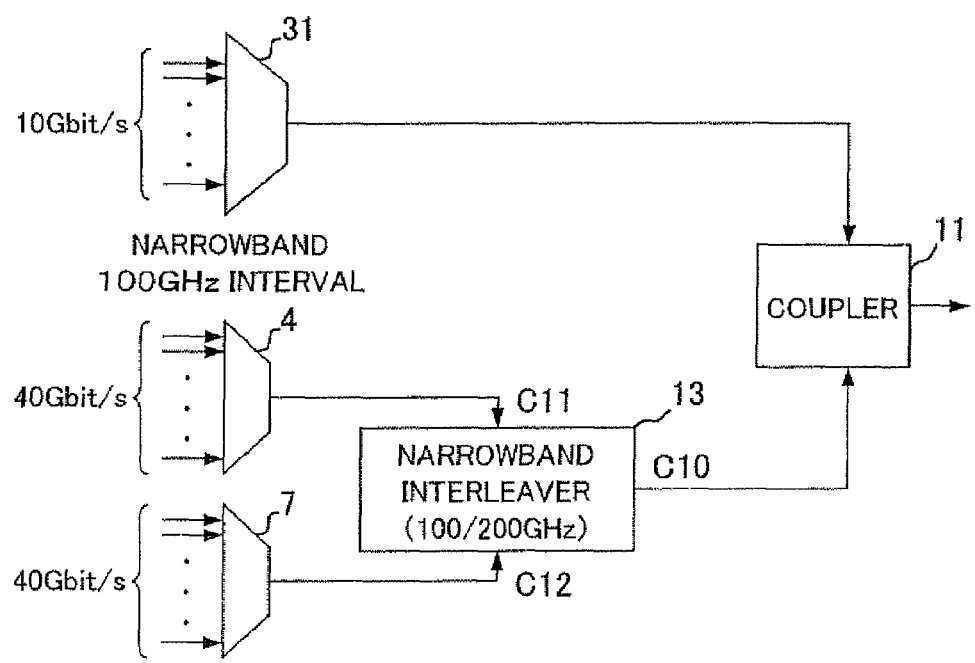
FIG. 10B is a block diagram depicting the configuration of the multiplexing unit of this WDM transmission system

FIG. 10A is a block diagram depicting the configuration of the demultiplexing unit of the WDM transmission system according to the fourth embodiment of the present invention, and FIG. 10B is a block diagram depicting the configuration of the multiplexing unit of the WDM transmission system.

The demultiplexing unit is comprised of a coupler 11, narrowband interleaver 13 and narrowband demultiplexers 31, 4 and 7. Composing elements the same as the first embodiment (demultiplexers 4 and 7) and the composing elements the same as the second embodiment (coupler 11 and narrowband interleaver 13) are denoted with the same reference numerals, for which description is omitted.

The WDM signals P0, where were output from the coupler 11, are input to the demultiplexer 31 and the narrowband interleaver 13.

The narrowband demultiplexer 31 has a 100 GHz frequency interval, and the internally installed narrowband filter allows only signal components with a predetermined bandwidth of each demultiplexed signal light to pass. Such a narrowband demultiplexer 31 can be constructed by integrating a narrowband filter, for filtering each signal light to be input with a predetermined transmission bandwidth, into a known AWG filter, for example. Here the bandwidth of the narrowband filter is set to 25 GHz, which is the same as the bandwidth of the 10 Gbit/s signal lights, therefore only a signal component with a 25 GHz bandwidth can pass through.

Figure 11:
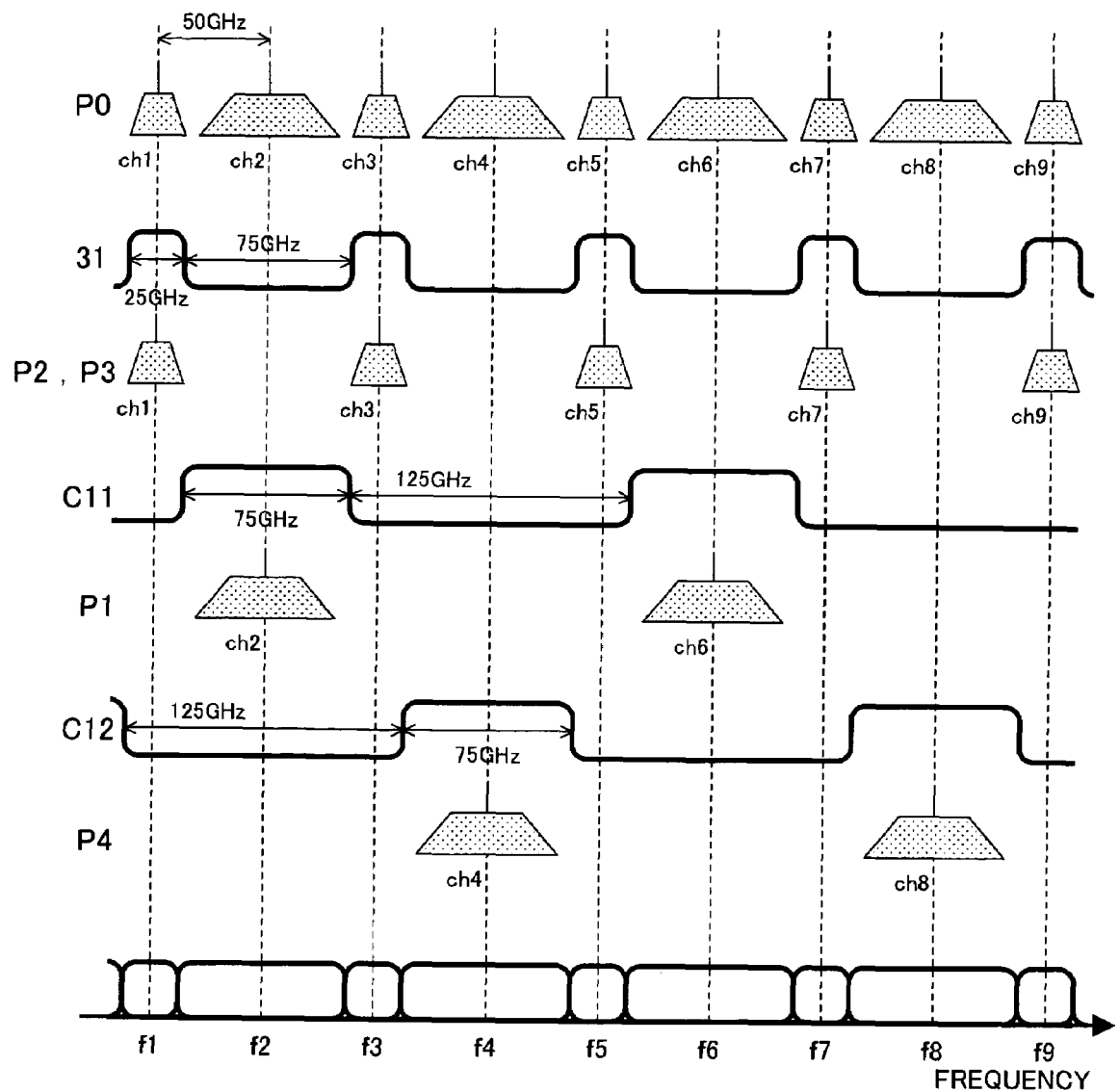
FIG. 11 is a diagram depicting the transmission characteristics of the narrow band demultiplexer and the narrow band interleaver according to the fourth embodiment of the present invention, and the status of the WDM signals being filtered by the narrow band demultiplexer and the narrow band interleaver.

FIG. 11 shows the transmission characteristics of the narrowband demultiplexer 31 and the narrowband interleaver 13, and the status when the WDM signals P0 are filtered by the narrowband demultiplexer 31 and narrowband interleaver 13.

The graph 31 in the second level in FIG. 11 shows the transmission characteristics of the narrowband demultiplexer 31. The narrowband demultiplexer 31 has a 100 GHz frequency interval, so the transmission band and the non-transmission band are repeated with a 100 GHz interval. By the internally installed narrowband filter, the bandwidth of the transmission band is reduced to 25 GHz, and the band width of the non-transmission band is expanded to 75 GHz. The central frequency of the transmission band is set to frequencies f1, f3, . . . (f [2$i$-1]).

By this narrowband demultiplexer 31, only 100 Gbit/s signal lights in the channel ch [2$i$-1], out of the WDM signals P0 to be input, pass through and are demultiplexed.

As described with reference to FIG. 7, the transmission characteristics of the narrowband interleaver 13 at the output port C11 side and the output port C12 side become the graph C11 in the fourth level and the graph C12 in the sixth level respectively. When the WDM signals P0 pass through the narrowband interleaver 13, the 40 GHz WDM signals in the channel ch [4$i$-2] are output and are demultiplexed into signal lights in each channel by the demultiplexer 4. From the output port C12, 40 GHz WDM signals in the channel ch [4$i$] are output and are demultiplexed into signal lights in each channel by the demultiplexer 7.

Now the multiplexing unit shown in FIG. 10B will be described in brief.

In the multiplexer 31, 10 Gbit/s signal lights in the channel ch [2$i$-1] are input and multiplexed, then are output to the coupler 11.

In the multiplexer 4, 40 Gbit/s signal lights in the channel ch [4$i$-2] are input and multiplexed, then are input to the input port C11 of the narrowband interleaver 13. In the multiplexer 7, 40 Gbit/s signal lights in the channel ch [4$i$] are input and multiplexed, then are input to the input port C12 of the narrowband interleaver 13.

The narrowband interleaver 13 multiplexes the WDM signals which are input to the input ports C11 and C12, and outputs them to the coupler 11 from the output port C10. In the coupler 11, the WDM signals from the demultiplexer 31 and the narrowband interleaver 13 are multiplexed, and the WDM signals P0 are output.

By the filtering using each multiplexer and interleaver, the noise, that exists in areas other than the bands where the signal lights exist, can be removed.

The coupler 11 of the multiplexing unit may be an interleaver.

According to the present embodiment as well, the 10 Gbit/s and 40 Gbit/s signal lights can be multiplexed/demultiplexed. By setting the narrowband filter of the demultiplexer and the narrowband interleaver according to the bandwidth of the signals, the change of the bit rate of the signal lights can be flexibly supported.

Even the case when the modulation scheme (e.g. NRZ modulation scheme, RZ modulation scheme, CSRZ modulation scheme) of signal lights is changed, can be flexibly supported in the same way as the case of the bit rate being changed.

Fifth Embodiment

In the fifth embodiment of the present invention, 10 Gbit/s and 40 Gbit/s signal lights are multiplexed/demultiplexed by the narrowband multiplexer/demultiplexer and the wideband multiplexer/demultiplexer.

Figure 12A:
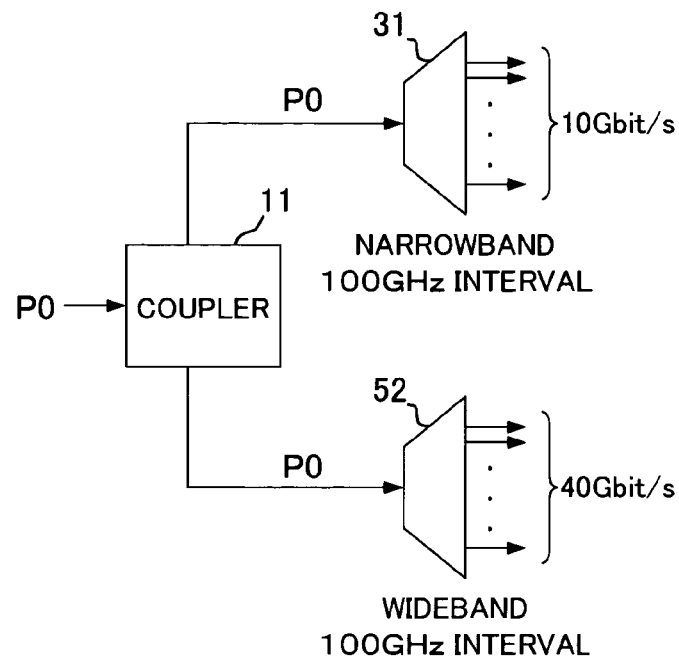
FIG. 12A is a block diagram depicting the configuration of the demultiplexing unit of the WDM transmission system according to the fifth embodiment of the present invention and FIG. 12B is a block diagram depicting the configuration of the multiplexing unit of this WDM transmission system.
Figure 12B:
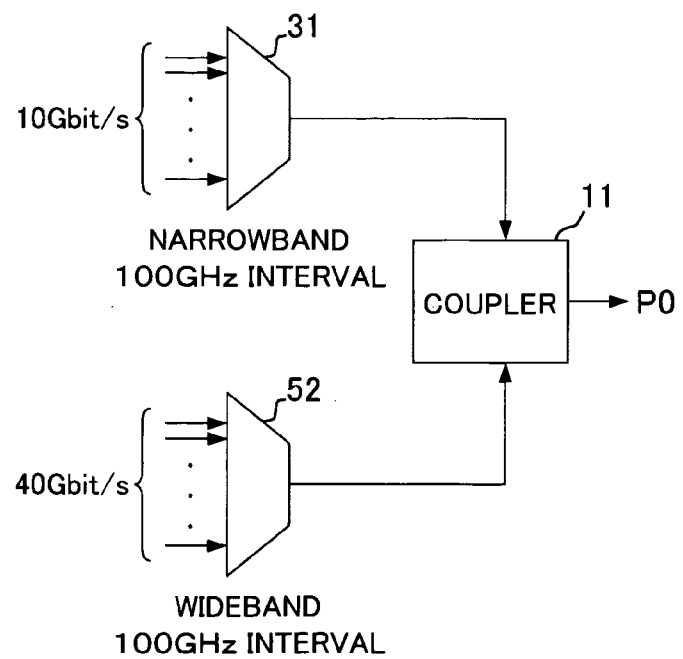

FIG. 12A is a block diagram depicting the configuration of the demultiplexing unit of the WDM transmission system according to the fifth embodiment of the present invention, and FIG. 12B is a block diagram depicting the multiplexing unit of the WDM transmission system.

The demultiplexing unit is comprised of a coupler 11 and demultiplexers 51 and 52. The coupler 11 is the same as that in the second embodiment shown in FIG. 6, which is denoted with the same reference numerals, and the narrowband interleaver 31 is the same as that in the fourth embodiment, which is denoted with the same reference numerals. The signal light P0 is also the same as that described in the previous embodiments.

The WDM signals P0, which were input to the coupler 11, are input to the narrowband demultiplexer 31 and the wideband demultiplexer 52.

Figure 13:
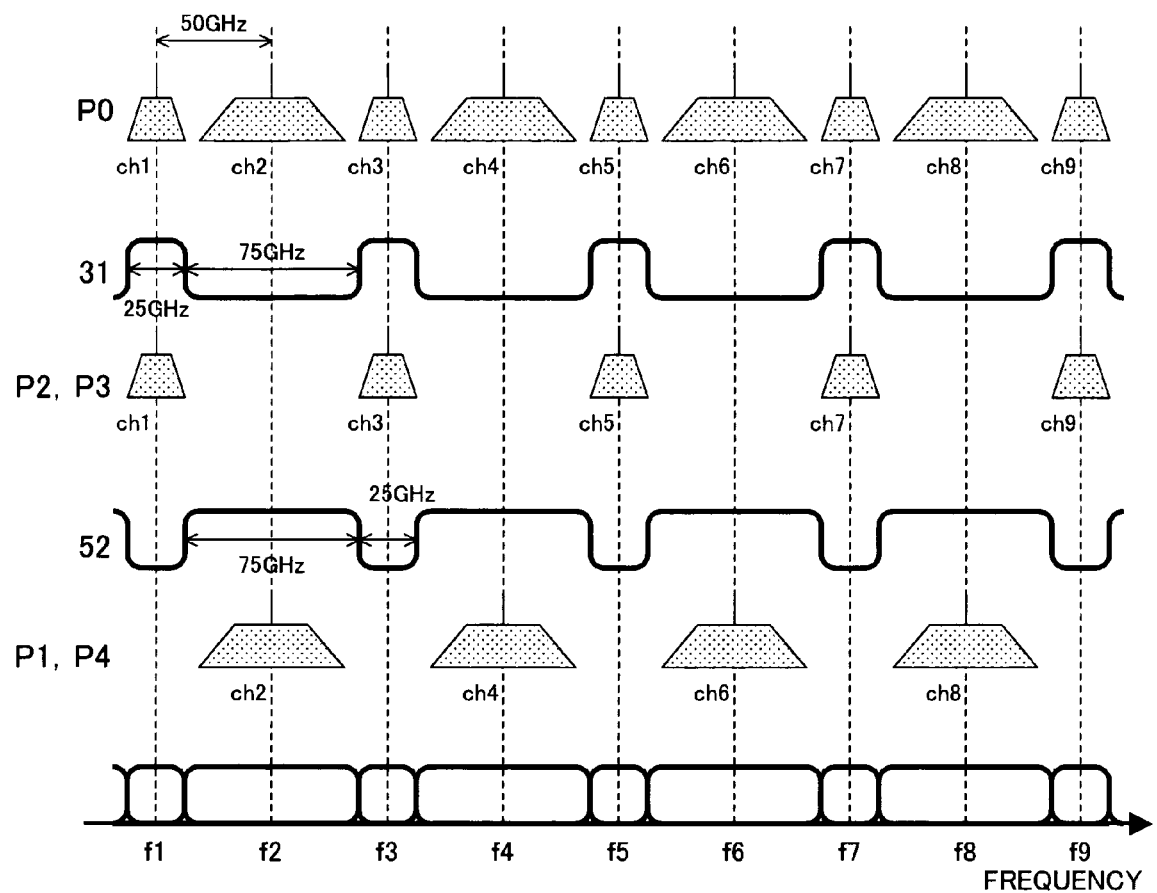
FIG. 13 is a diagram depicting the transmission characteristics of the narrowband demultiplexer and the wideband demultiplexer according to the fifth embodiment of the present invention, and the status of the WDM signals being filtered by the narrowband demultiplexer and the wideband demultiplexer.

FIG. 13 shows the transmission characteristics of the narrowband demultiplexer 31 and the wideband demultiplexer 52, and the status when the WDM signals P0 are filtered by the narrowband demultiplexer 31 and the wideband demultiplexer 52.

Based on the transmission characteristics of the narrowband demultiplexer 31 shown in the graph 31 in the second level in FIG. 13, the 10 Gbit/s signal lights in the channel ch [2$i$-1], out of the WDM signals P0, are demultiplexed by the demultiplexer 31 and are output.

As the graph 52 in FIG. 13 shows, in the wideband demultiplexer 52, the transmission band and the non-transmission band are alternately repeated with a 100 GHz interval, where the bandwidth of the transmission band is expanded from 50 GHz to 75 GHz, and the non-transmission band is reduced from 50 GHz to 25 GHz. The central frequency of the transmission band is set to the frequency f [2$i$]. By the wideband demultiplexer 52 with such characteristics, 40 Gbit/s signal lights in the channel ch [2$i$], out of the WDM signals P0, are demultiplexed and output.

Now the multiplexing unit shown in FIG. 12B will be described in brief.

In the multiplexer 31, 10 Gbit/s signal lights in the channel ch[2$i$-1] are input and multiplexed, then are input to the coupler 11. In the multiplexer 52, 40 Gbit/s in the channel ch [2$i$] are input and multiplexed, then are input to the coupler 11. In the coupler 11, the WDM signals from these two multiplexers 31 and 52 are multiplexed and are output.

By the transmission characteristics of each multiplexer, the noise, that exists in areas other than the band where the signal lights exist, can be removed.

According to the present embodiment as well, the 10 Gbit/s and 40 Gbit/s signal lights can be multiplexed/demultiplexed. By adjusting the transmission band (non-transmission band) of the narrowband demultiplexer and the wideband demultiplexer, the change of the signal band can be flexibly supported.

Sixth Embodiment

In the sixth embodiment, WDM signals, where 10 Gbit/s signal lights in three channels and 40 Gbit/s signal lights in one channel are multiplexed in this ratio, are multiplexed/demultiplexed by the combination of the interleavers.

Figure 14A:
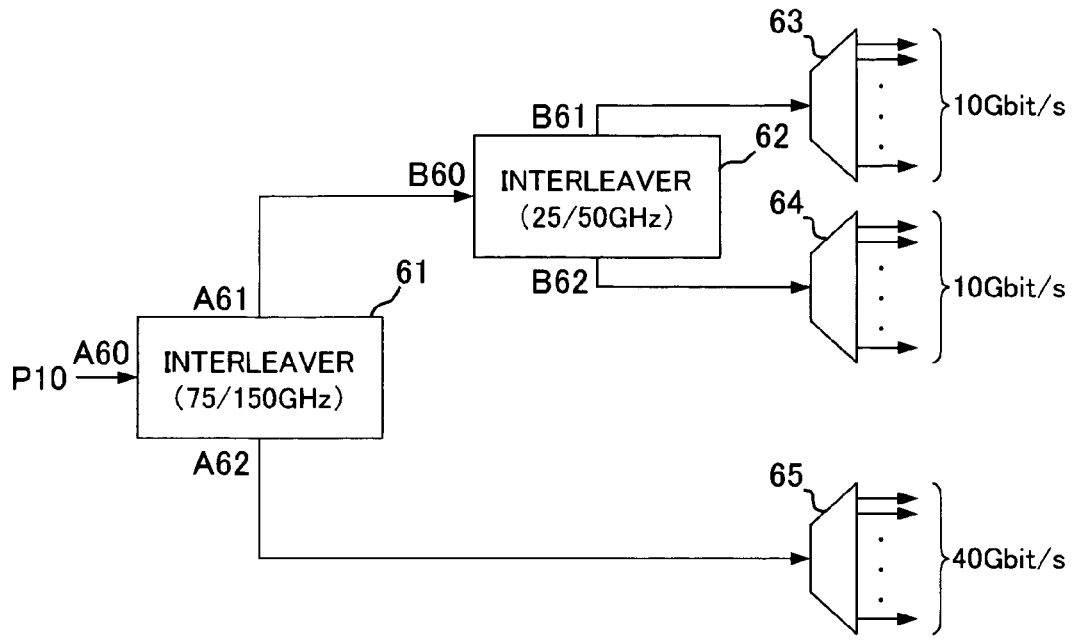
FIG. 14A is a block diagram depicting the configuration of the demultiplexing unit of the WDM transmission system according to the sixth embodiment of the present invention.
Figure 14B:
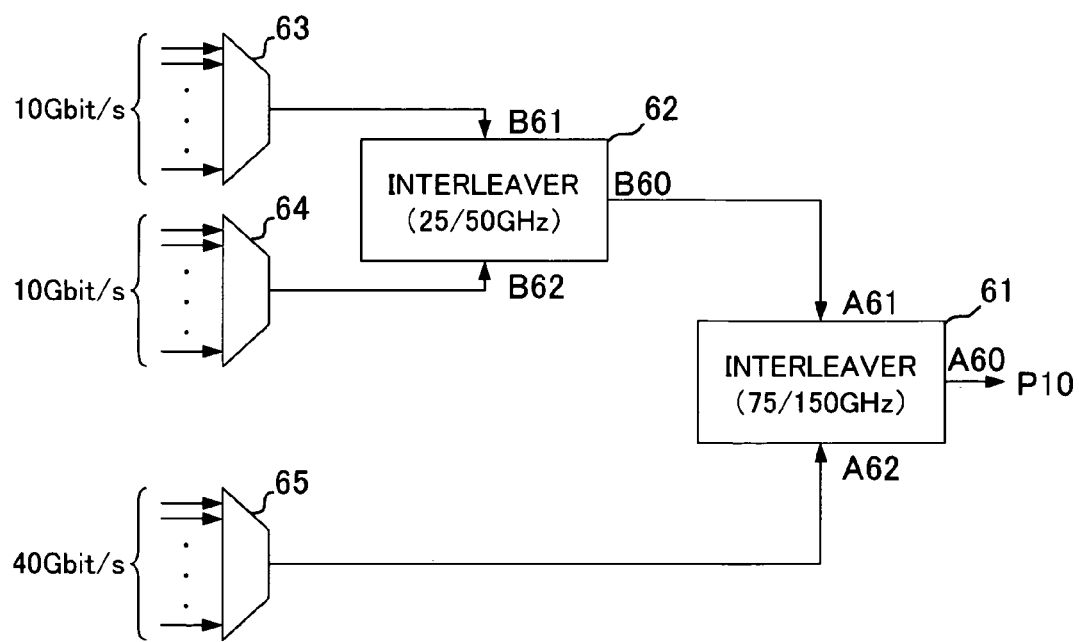
FIG. 14B is a block diagram depicting the multiplexing unit of this WDM transmission system.

FIG. 14A is a block diagram depicting the configuration of the demultiplexing unit of the WDM transmission system according to the sixth embodiment of the present invention, and FIG. 14B is a block diagram depicting the configuration of the multiplexing unit of the WDM transmission system.

The demultiplexing unit is comprised of the interleavers 61 and 62 and the demultiplexers 63-65. To the interleaver 61 of the demultiplexing unit, the WDM signals P10 are input. The WDM signals P10 are shown on the very top level in FIG. 15.

Figure 15:
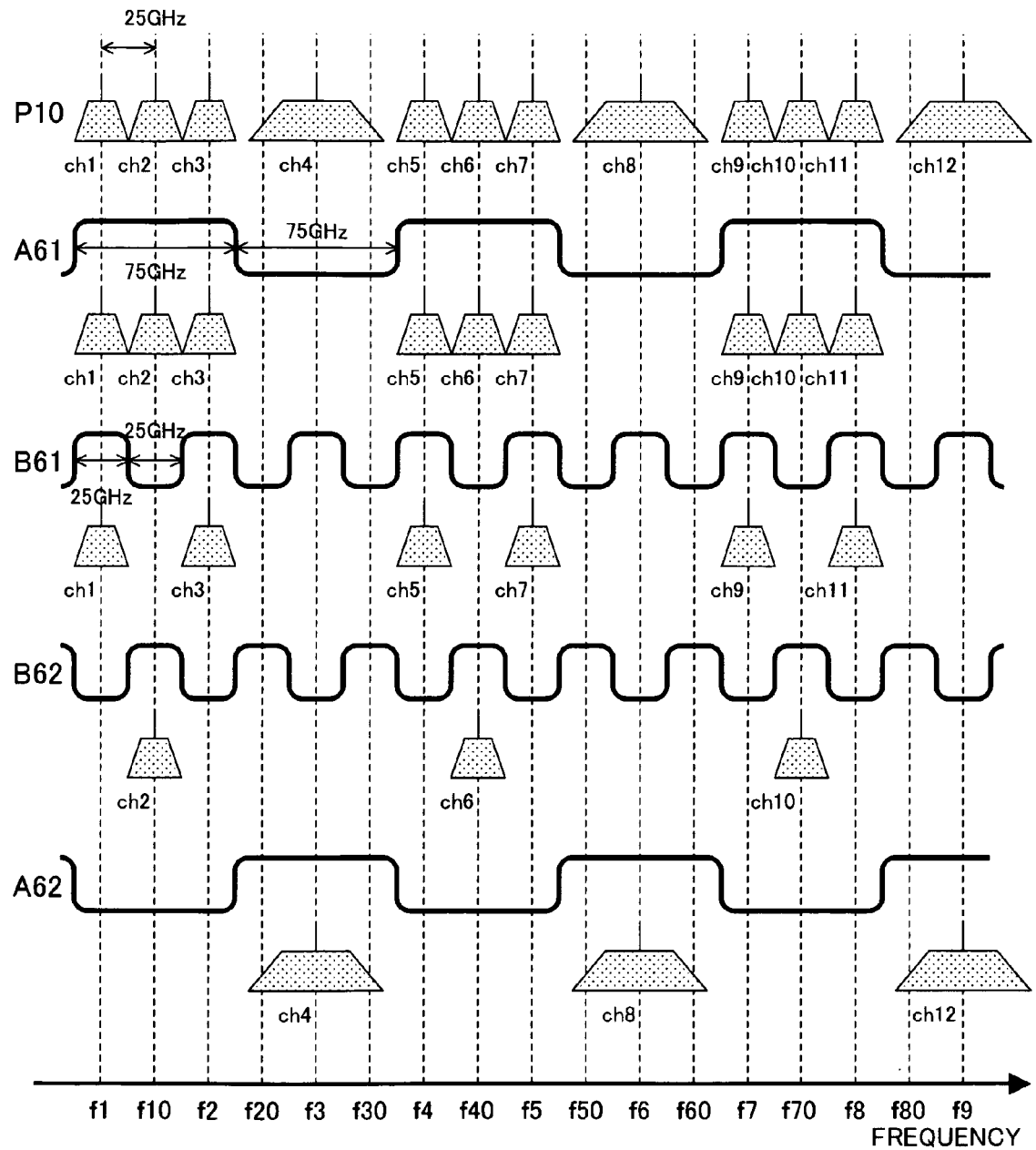
FIG. 15 is a diagram depicting the transmission characteristics of the interleaver according to the sixth embodiment, and the status of the WDM signals being filtered by the interleaver.

The WDM signals P10 are signals where the 40 Gbit/s signal lights with a 25 GHz bandwidth in three channels and 40 Gbit/s signal lights with a 75 GHz bandwidth in one channel are multiplexed in this ratio. In FIG. 15, 10 Gbit/s signal lights are arrayed next to each other for three channels, and a 40 Gbit/s signal light is arrayed between these three channels of 10 Gbit/s signal groups. Specifically, 10 Gbit/s signal lights are allocated to the channels ch1-ch3, ch5-ch7, ch9-ch11, . . . and 40 Gbit/s signal lights are allocated to the channels ch4, ch8, ch12, . . .

The adjacent 10 Gbit/s signal lights are arrayed with a 25 GHz interval. Therefore a grid with the frequency f10 (=(f1+f2)/2) is created between the frequencies f1 and f2. In the same way, grids with the frequencies f20, f30, . . . are created.

These WDM signals, which has a 0.47 Gbit/s/Hz spectral efficiency, can implement a relatively high spectral frequency (see FIG. 5B).

The interleaver 61 has similar functions as the interleaver 1 of the first embodiment, but the frequency interval after multiplexing/demultiplexing is different from the interleaver 1, that is, the frequency interval after demultiplexing is 150 GHz, and the frequency interval after multiplexing is 75 GHz. The interleaver 62 also has similar functions as the interleaver 1, but the frequency interval after multiplexing/demultiplexing is different from the interleaver 1, that is, the frequency interval after demultiplexing is 50 GHz, and the frequency interval after multiplexing is 25 GHz.

FIG. 15 shows the transmission characteristics of the interleavers 61 and 62, and the status when the WDM signals P10 are filtered by the interleavers 61 and 62.

The graph A61 in FIG. 15 shows the transmission characteristics of the interleaver 61 at the output port A61 side. At the output port A61 side, the transmission band and the non-transmission band with a 75 GHz bandwidth are repeated alternately, and the central frequency of the transmission band is set to the grid of the channels ch2, ch6, ch10, . . . at the center of the adjacent three channels. By this, as shown in the third level, only 10 Gbit/s signals of the adjacent three channels are output from the output port A61, and 40 Gbit/s signals are removed. The 10 Gbit/s signals which were output are input to the input port B60 of the interleaver 62.

The graph A62 in the eighth level shows the transmission characteristics of the interleaver 61 at the output port A62 side. The transmission characteristics at the output port A62 side are the opposite of the transmission characteristics at the output port A61 side. By this, only 40 Gbit/s signals are output from the output port A62, and 10 Gbit/s signals are removed. The 40 Gbit/s signals which were output are input to the demultiplexer 65, and are demultiplexed into the signal lights with respective wavelengths.

For the demultiplexer 65, an AWG filter with a transmission band, where the central frequency is f3, f6, f9, . . . with a 150 GHz interval and a bandwidth is at least 75 GHz, for example, can be used.

The graph B61 in the fourth level shows the transmission characteristics of the interleaver 62 at the output port B61 side. At the output port B61 side, the transmission band and the non-transmission band with a 25 GHz bandwidth are repeated alternately, and the central frequency of the transmission band is set to the grid of the channel ch [2$i$-1]. By this, only [signals in] channels ch1, ch3, ch5, ch7, ch9, ch11, . . . out of 10 Gbit/s signals, are output, and [signals in] channel 2, ch6, ch10, . . . are removed. The 10 Gbit/s signals which are output are demultiplexed into signal lights with respective wavelengths by the demultiplexer 63.

For the demultiplexer 63, an AWG filter with a transmission band where the central frequency is f1, f2, f3, . . . , with a 50 GHz interval and the bandwidth is at least 25 GHz, for example, can be used, and out of the output terminals of the demultiplexing unit 63, the output terminals with frequencies f3, f6, f9, . . . , where the signal lights are not output, are not used.

The graph B62 in the sixth level shows the transmission characteristics of the interleaver 62 at the output port B62 side, and these transmission characteristics are the opposite of the transmission characteristics at the output port B61 side (graph B61). Therefore only 10 Gbit/s signals in channels ch2, ch6, ch10, . . . are output from the output port B62, and the other 10 Gbit/s signals are removed. The 10 Gbit/s signals which are output are demultiplexed into the signal lights with respective wavelengths by the demultiplexer 64.

In the multiplexing unit in FIG. 14B, the 10 Gbit/s signals in channels ch1, ch3, ch5, ch7, ch9, ch11, . . . are input to the multiplexer 63, and multiplexed, then are input to the input port B61 of the interleaver 62. The 10 Gbit/s signals in channels ch2, ch6, ch10, . . . are input to the multiplexer 64 and multiplexed, then are input to the input port B62 of the interleaver 62.

The 40 Gbit/s signals in channels ch4, ch8, ch12, . . . are input to the multiplexer 65, and multiplexed, then are input to the input port A62 of the interleaver 61.

The interleaver 62 multiplexes the WDM signals from the multiplexers 63 and 64, and inputs the WDM signals after multiplexing to the input port A61 of the interleaver 61. The interleaver 61 multiplexes the WDM signals from the interleaver 62 and multiplexer 65, and outputs them.

Even in the case when 10 Gbit/s signals and 40 Gbit/s signals are arrayed in a 3 to 1 ratio the signals can be multiplexed/demultiplexed by combining the interleavers.

Seventh Embodiment

In the seventh embodiment, WDM signals P10, which are the same as the sixth embodiment, are multiplexed/demultiplexed by an interleaver which has a different configuration than the sixth embodiment.

Figure 16A:
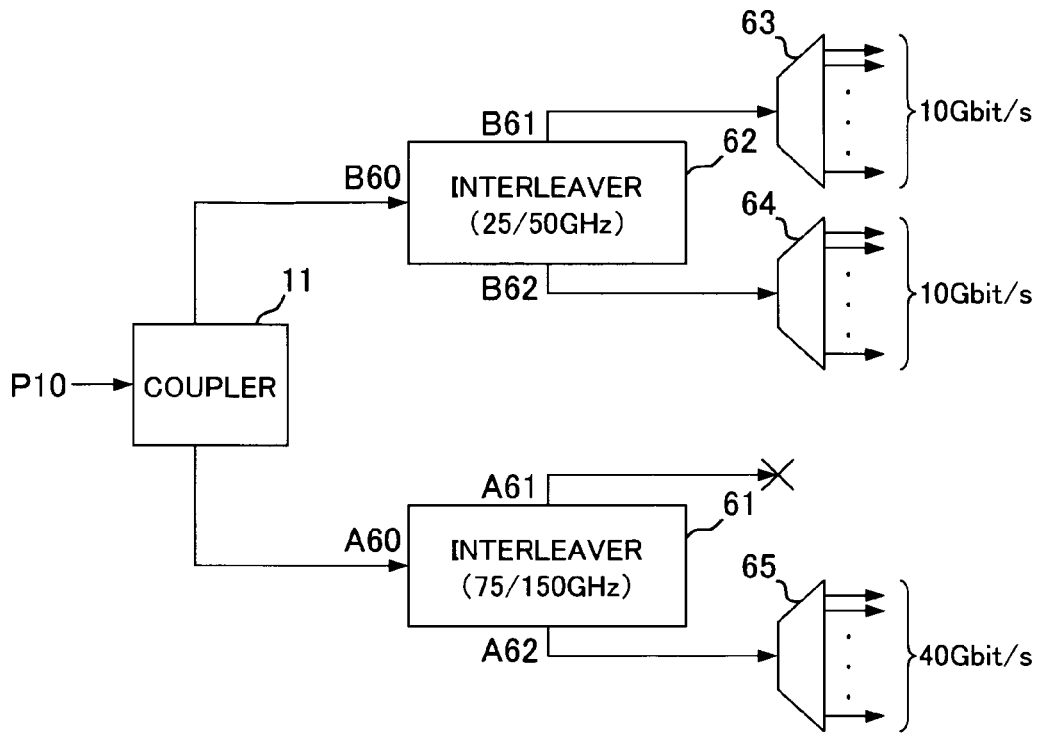
FIG. 16A is a block diagram depicting the configuration of the demultiplexing unit of the WDM transmission system according to the seventh embodiment of the present invention.
Figure 16B:
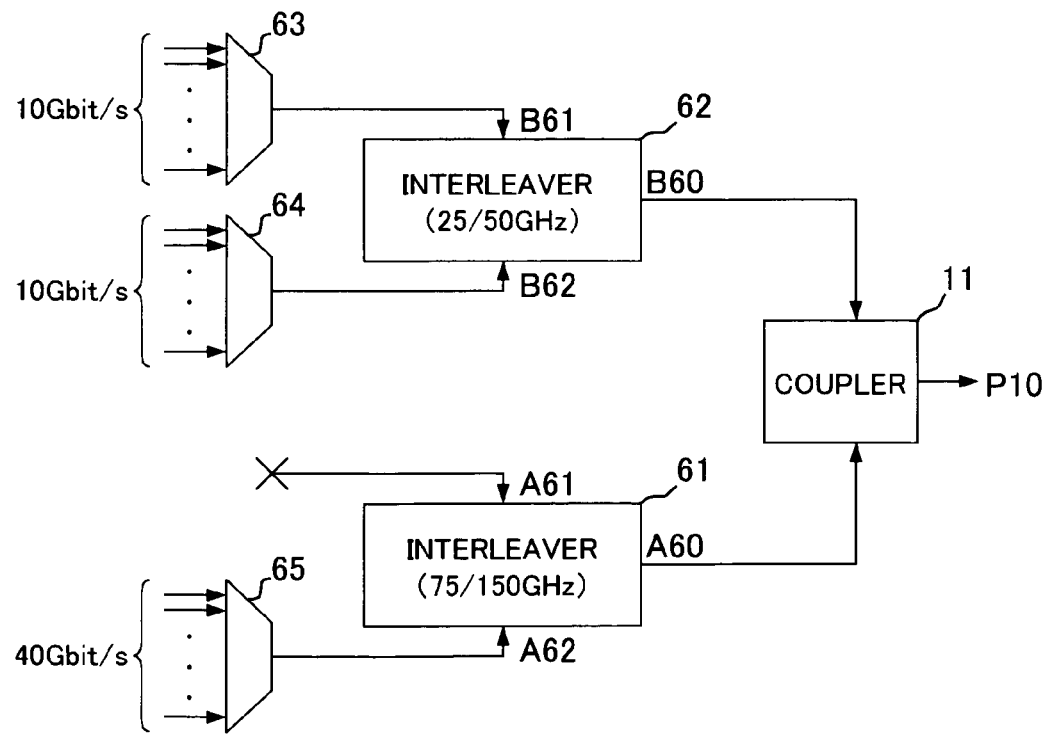
FIG. 16B is a block diagram depicting the multiplexing unit of this WDM transmission system.

FIG. 16A is a block diagram depicting the configuration of the demultiplexing unit of the WDM transmission system according to the seventh embodiment of the present invention, and FIG. 16B is a block diagram depicting the configuration of the multiplexing unit of the WDM transmission system.

The demultiplexing unit is comprised of a coupler 11, interleavers 62 and 61, and demultiplexers 63-65. The interleavers 62 and 61 and the demultiplexers 63-65 are the same as those denoted with the same reference numerals in FIG. 6. The coupler 11 is the same as that denoted with the same reference numerals in the second embodiment.

To this demultiplexing unit as well, the WDM signals P10, in the same signal array as the sixth embodiment, are input. The WDM signals P10, which were input, are branched into two by the coupler 11, and are input to the interleavers 62 and 61 respectively.

Figure 17:
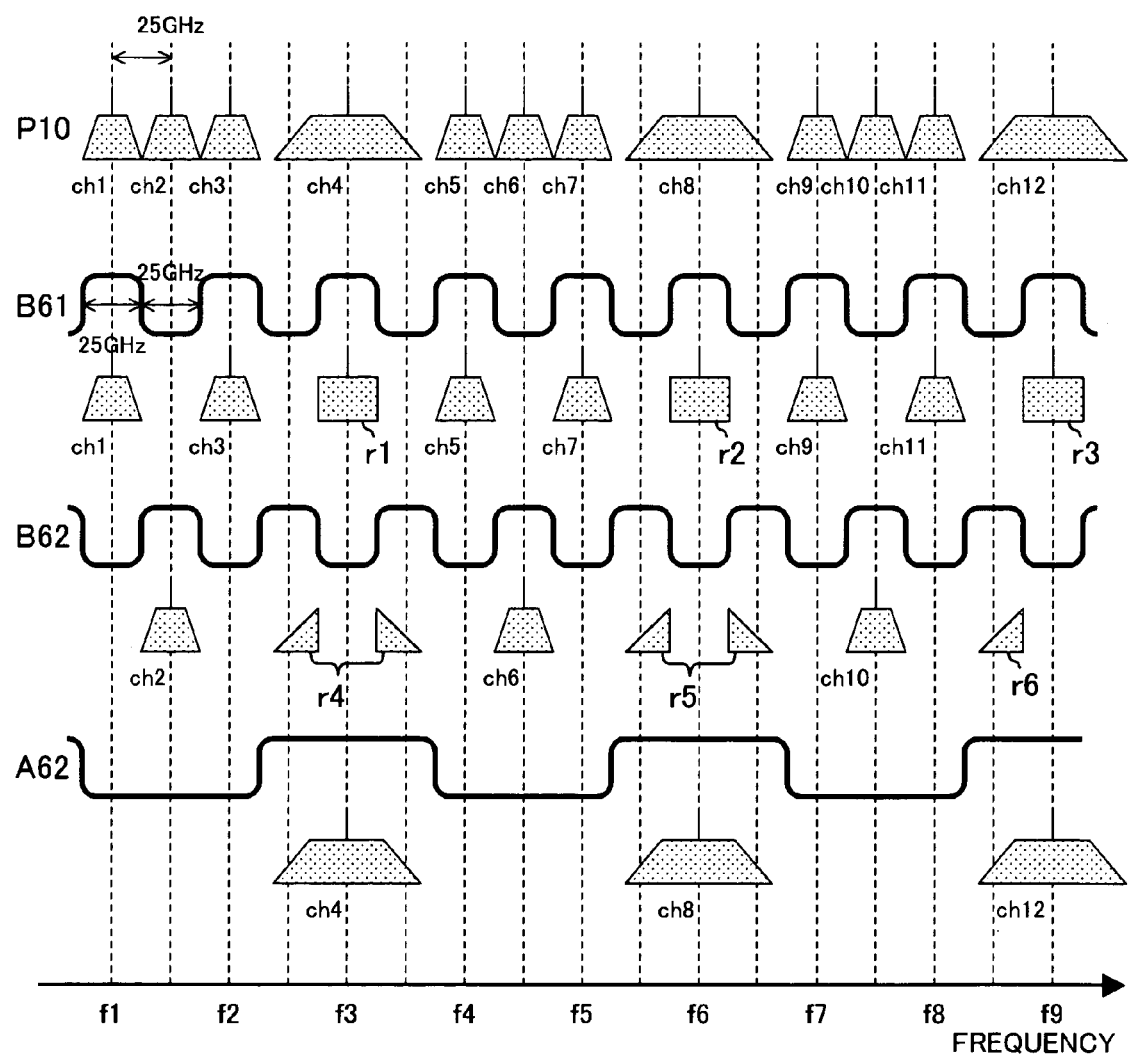
FIG. 17 is a diagram depicting the transmission characteristics of the narrowband demultiplexer according to the seventh embodiment of the present invention, and the status of the WDM signals being filtered by the narrowband demultiplexer.

From the output port B61 of the interleaver 62, 10 Gbit/s signals in the channels ch1, ch3, ch5, ch7, ch9, ch11, ... are output (see the third level) based on the transmission characteristics shown in the second level in FIG. 17. In addition to this, a part of the 40 Gbit/s signal components r1, r2, r3, ... in the channels ch4, ch8, ch12, are output from the output port B61. The signals and a part of the components which were output are input to the demultiplexer 63, are demultiplexed into each signal, and are output. By not using output terminals, where a part of components r1, r2, r3, are output, out of the output terminals of the demultiplexer 63, these components can be removed.

Based on the transmission characteristics shown in the fourth level, a part of the 40 Gbit/s signal components r4, r5, r6, ... are output from the output port B62 of the interleaver 62, in addition to the 10 Gbit/s signals in the channels ch2, ch6, ch10, ... (see fifth level). The signals and a part of the components which were output are input to the demultiplexer 64, are demultiplexed into each signal, and are output. By not using the output terminals, where a part of the components r4, r5, r6, ... are output, out of the output terminals of the demultiplexer 64, these components can be removed.

In the interleaver 61, only the output port A62 is used, and the output port A61 is not used. Therefore as the sixth level and the seventh level show, 40 Gbit/s signals in channels ch4, ch8, ch12, ... can be acquired from the demultiplexer 65.

In the multiplexing unit shown in FIG. 16B, 10 Gbit/s signals in the channels ch1, ch3, ch5, ch7, ch9, ch11, ... are input to the multiplexer 63, and multiplexed, then are input to the input port B61 of the interleaver 62. The 10 Gbit/s signals in the channels ch2, ch6, ch10, ... are input to the multiplexer 64, and multiplexed, then are input to the input port B62 of the interleaver 62.

The 40 Gbit/s signals in the channels ch4, ch8, ch12, ... are input to the multiplexer 65, and after multiplexing, are input to the input port A62 of the interleaver 61. The input port A61 of the interleaver 61 is not used.

The interleaver 62 multiplexes the WDM signals from the multiplexers 63 and 64, and inputs the WDM signals after multiplexing to the coupler 11. The interleaver 61 inputs the WDM signals from the multiplexer 65 to the coupler 11. By this, the WDM signals P0 are output from the coupler 11.

In this way, even in the case when 10 Gbit/s signals and 40 Gbit/s signals are arrayed in a 3 to 1 ratio, the signals can be multiplexed/demultiplexed by combining the interleavers.

The present invention can provide a WDM transmission system and an optical transmitter and optical receiver constituting this system, which can multiplex or demultiplex and transmit signal lights, where signal lights with different signal bandwidths are wavelength-division multiplexed because the transmission speed or the modulation scheme is different, without deteriorating the transmission quality very much.

Also the present invention can provide a WDM transmission system and an optical transmitter and optical receiver, of which the spectral efficiency is high. Also the present invention can provide a WDM transmission system optical transmitter and optical receiver that allow use of a signal frequency grid by ITU-T recommendations.

What is claimed is:

1. An optical receiver receiving wavelength division multiplexing signals in which signal lights with different signal bandwidths are wavelength-division multiplexed, the receiver having a demultiplexing unit demultiplexing the wavelength division multiplexing signals and outputting the demultiplexed signal lights from a plurality of output ports, wherein each output port has transmission characteristics settable such that the bandwidth of the transmission band in which the light is transmitted and a bandwidth of the non-transmission band in which the light is not transmitted are different, and the transmission band substantially matches the signal band of the signal lights that are output from said output port of the received wavelength division multiplexing signals, and the wavelength division multiplexing signal includes first signal lights, each with a transmission bandwidth F1, and second signal lights, each with a transmission bandwidth F2, which are arrayed alternately with the frequency interval F, wherein $F \geq (F1+F2)/2$, said demultiplexing unit further comprising:

a first interleaver having a first input port, inputting the wavelength division multiplexing signals, and first and second output ports filtering and outputting, to the first output port, the wavelength division multiplexing signals based on the transmission characteristics where the transmission band and the non-transmission band with the bandwidth 2F are alternately repeated, and filtering and outputting, to the second output port, the wavelength division multiplexing signals based on transmission characteristics opposite to the transmission characteristics for the first output port;

a second interleaver having a second input port inputting the signal lights output from first output port, and third and fourth output ports, filtering and outputting to the third output port, the signal lights output from the first output port based on the transmission characteristics where the transmission band and the non-transmission band with the bandwidth 2F are alternately repeated, and filtering and outputting to the fourth output port, the signal lights output from the first output port based on the transmission characteristics opposite to the transmission characteristics for the third output port; and a third interleaver having a third input port inputting the signal lights output from the second output port, and fifth and sixth output ports filtering and outputting, to the fifth output port, the signal lights output from the second output port based on the transmission characteristics where the transmission band and the non-transmission band with the bandwidth 2F are alternately repeated, and filtering and outputting to the sixth output port, the signal lights output from the second output port based on transmission characteristics opposite to the transmission characteristics for the fifth output port, wherein the central frequency of the transmission bands of the first, second and third interleavers are shifted from the central frequency of the signal bands of the second signal lights so that the overlapping portion of the transmission bands of the first and third output ports includes the signal bands of a first set of the second signal lights, the overlapping portion of the transmission bands of said first and fourth output ports includes the signal bands of a first set of the first signal lights, the overlapping portion of the transmission bands of the second and fifth output ports includes the signal bands of a second set of the first signal lights, and the overlapping portion of the transmission bands of the second and sixth output ports includes the signal bands of a second set of the second signal lights.

2. The optical receiver according to claim 1, wherein:
the central frequency of the transmission band of said first output port shifts F1/2 to the lower frequency side from the central frequency of the signal band of said second signal light, and
the central frequency of the transmission band of said third and fifth output ports shifts F1/2 to the higher frequency side from the central frequency of the signal band of said second signal light.

3. The optical receiver according to claim 1, wherein said demultiplexing unit further includes demultiplexers demultiplexing signal lights that are output from said third to sixth output ports to signal lights with respective wavelengths.

4. An optical transmitter wavelength division multiplexing and transmitting a plurality of signal lights with different signal bandwidths, comprising:
a multiplexing unit having a plurality of input ports and filtering to multiplex a plurality of signal lights input from the plurality of input ports, respectively based on the transmission characteristics of each of the plurality of input ports, wherein the plurality of signal lights comprises:
  a first signal light group consisting of a plurality of signal lights each having a transmission bandwidth F1 and being arrayed with the frequency interval 4F;
  a second signal light group consisting of a plurality of signal lights each having a transmission bandwidth F2 and being arrayed at the positions at frequency interval F, wherein F≧(F1+F2)/2, from the central frequency of each signal light constituting the first signal light group;
  a third signal light group consisting of a plurality of signal lights each having transmission bandwidth F1 and being arrayed at the positions at frequency interval 2F from the central frequency of each signal light constituting the first signal light group, and
  a fourth signal light group consisting of a plurality of signal lights each having said transmission bandwidth F2 and being arrayed at positions at frequency interval 2F from the frequency of each signal light constituting the second signal light group,
the multiplexing unit further comprises:
a first interleaver which further comprises a first port for inputting the first signal light group with the transmission characteristics in which the transmission band and the non-transmission band with the bandwidth 2F are alternately repeated, and a second port inputting the second signal light group with opposite transmission characteristics from the first port, and multiplexes and outputs the first and second signal light groups which were input to the first and second ports, respectively;
a second interleaver which further comprises a third port for inputting the third signal light group with transmission characteristics in which the transmission band and the non-transmission band with the bandwidth 2F are alternately repeated, and a fourth port inputting the fourth signal light group with the opposite transmission characteristics from the third port, and which multiplexes and outputs the third and fourth signal light groups which were input to the third and fourth ports; and
a third interleaver which further comprises a fifth port for inputting signal lights from the first interleaver with the transmission characteristics where the transmission band and the non-transmission band with the bandwidth 2F are alternately repeated, and a sixth port for inputting signal lights from the second interleaver with the opposite transmission characteristics from the fifth port, and which multiplexes and outputs the signal lights which were input to the fifth and sixth ports,
wherein the central frequencies of the transmission bands of the first, second and third interleavers are shifted from the central frequency of each signal light of the second and fourth signal light groups so that the overlapping portion of the transmission bands of the first and fifth ports includes the signal bands of each signal light of the first signal light group, the overlapping portion of the transmission bands of the second and fifth ports includes the signal bands of each signal light of the second signal group, the overlapping portion of the transmission bands of the third and sixth ports includes the signal bands of each signal light of the third signal light group, and the overlapping portion of the transmission bands of the fourth and sixth ports includes the signal bands of each signal light of the fourth signal light group.

5. The optical transmitter according to claim 4, wherein:
the central frequency of the transmission band of the first and fourth ports shift shifts F1/2 to the higher frequency side from the central frequency of each signal light of the fourth signal light group, and
the central frequency of the transmission band of the fifth port shifts F1/2 to the lower frequency side from the central frequency of each signal light of the second signal light group.

6. The optical transmitter according to claim 4 wherein:
the multiplexing unit further comprises:
a first multiplexer multiplexing each signal light of the first signal light group, generating the first signal light group and inputting the same to the first port;
a second multiplexer multiplexing each signal light of the second signal light group, generating the second signal light group, and inputting the same to the second port;
a third multiplexer multiplexing each signal light of the third signal light group, generating the third signal light group, and inputting the same to the third port; and
a fourth multiplexer multiplexing each signa,l light of the fourth signal light group, generating the fourth signal light group, and inputting the same to the fourth port.

* * * * *

UNITED STATES PATENT AND TRADEMARK OFFICE
CERTIFICATE OF CORRECTION

PATENT NO. : 7,437,074 B2
APPLICATION NO. : 10/809929
DATED : October 14, 2008
INVENTOR(S) : Kentaro Nakamura et al.

Page 1 of 1

It is certified that error appears in the above-identified patent and that said Letters Patent is hereby corrected as shown below:

Column 22, Line 41, after "ports" delete "shift".

Column 22, Line 59, change "signa,l" to --signal--.

Signed and Sealed this

Tenth Day of February, 2009

JOHN DOLL
*Acting Director of the United States Patent and Trademark Office*